(12) United States Patent
Kryszczynski et al.

(10) Patent No.: US 11,428,845 B2
(45) Date of Patent: Aug. 30, 2022

(54) SYSTEM AND METHOD FOR SENSING SEISMIC ACOUSTIC SIGNALS

(71) Applicant: Quantum Technology Sciences, Inc., Cocoa Beach, FL (US)

(72) Inventors: Brian Richard Kryszczynski, Melbourne, FL (US); Mark Andrew Tinker, Merritt Island, FL (US); Paul Armin Nyffenegger, Rockledge, FL (US); Arthur Owen Endress, Dallas, TX (US); Kenneth Allan Ports, Indialantic, FL (US)

(73) Assignee: Quantum Technology Sciences, Inc., Cocoa Beach, FL (US)

( * ) Notice: Subject to any disclaimer, the term of this patent is extended or adjusted under 35 U.S.C. 154(b) by 0 days.

(21) Appl. No.: 15/343,312

(22) Filed: Nov. 4, 2016

(65) Prior Publication Data

US 2017/0146674 A1    May 25, 2017

Related U.S. Application Data

(60) Provisional application No. 62/250,605, filed on Nov. 4, 2015.

(51) Int. Cl.
  *G01V 13/00*   (2006.01)
  *G10K 11/00*   (2006.01)
  *G01V 1/18*    (2006.01)

(52) U.S. Cl.
  CPC .............. *G01V 13/00* (2013.01); *G01V 1/18* (2013.01); *G10K 11/004* (2013.01)

(58) Field of Classification Search
  None
  See application file for complete search history.

(56) References Cited

U.S. PATENT DOCUMENTS

| 3,798,474 | A | * | 3/1974 | Cassand | H01L 41/1132 310/331 |
| 3,979,565 | A | * | 9/1976 | McShane | B06B 1/0674 310/312 |
| 4,568,851 | A | * | 2/1986 | Soni | H01L 41/087 174/131 A |
| 4,809,244 | A | | 2/1989 | Penneck | |

(Continued)

OTHER PUBLICATIONS

SoundproofCow, https://www.soundproofcow.com/foam-absorb-sound/ (Year: 2016).*

(Continued)

*Primary Examiner* — Hovhannes Baghdasaryan
(74) *Attorney, Agent, or Firm* — Accel IP Law, PLLC; Ferdinand (Fred) M. Romano

(57) ABSTRACT

A method for forming a sensing system responsive to a wavefield of acoustic or seismic signals. One embodiment includes providing a foil layer having first and second opposing surfaces and piezoelectric properties. The foil layer, configured as a sheet, is positioned about a frame surface which provides the foil layer a stable shape while permitting the sheet configuration of the foil layer to be responsive to a wavefield of seismic or acoustic energy. Coupling between the foil layer and the frame is so limited as to render direct coupling of the foil layer with signals of the wavefield the predominant means for stimulating the sensor element with seismic energy.

29 Claims, 18 Drawing Sheets

(56) References Cited

U.S. PATENT DOCUMENTS

| | | | | |
|---|---|---|---|---|
| 5,257,243 | A * | 10/1993 | DeChico | G01V 1/201 367/155 |
| 5,434,830 | A * | 7/1995 | Martin | B06B 1/0688 310/322 |
| 6,411,014 | B1 * | 6/2002 | Toda | B06B 1/0688 310/324 |
| 2005/0047278 | A1 * | 3/2005 | Andreis | B06B 1/0674 367/162 |
| 2010/0276215 | A1 * | 11/2010 | Duheille | G06F 3/0416 178/18.04 |
| 2011/0166459 | A1 * | 7/2011 | Kopetsch | A61B 5/021 600/485 |
| 2012/0174676 | A1 | 7/2012 | Nyffenegger | |
| 2013/0208571 | A1 | 8/2013 | Pearce | |
| 2014/0352440 | A1 * | 12/2014 | Fennell | G01N 29/22 73/632 |
| 2015/0350792 | A1 | 12/2015 | Grosh | |

OTHER PUBLICATIONS

Abdessalam, https://www.sciencedirect.com/science/article/pii/S0003682X16305308 (Year: 2017).*

* cited by examiner

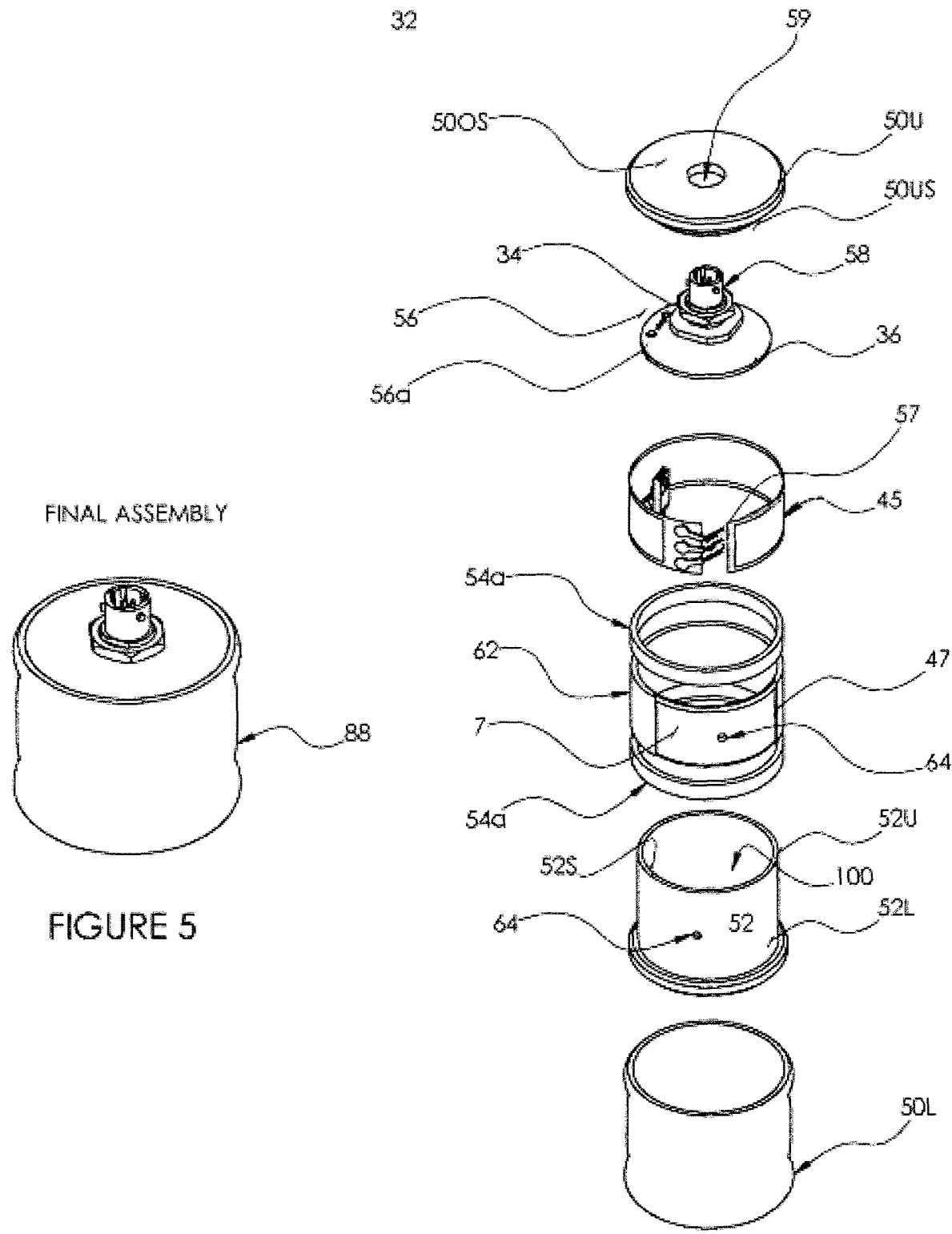

Relative Sensitivity

| Source | Sensor Type | Threshold Detection Distance (m) |
|---|---|---|
| Emerging Impulsive Transients (Footsteps) | Foil | 109 |
| | Cable | 63 |
| Emerging Continuous Waveforms (Motorized Vehicles) | Foil | 406 |
| | Cable | 187 |

Figure 15

SYSTEM AND METHOD FOR SENSING SEISMIC ACOUSTIC SIGNALS

RELATED APPLICATIONS

This application claims priority to U.S. Patent Application 62/250,605 filed Nov. 4, 2015. This application discloses improvements over subject matter disclosed in the following United States patents: U.S. Pat. Nos. 9,057,796; 9,091,780; and disclosed in United States patent application US 2012/0182835 each of which is incorporated herein by reference.

FIELD OF THE INVENTION

This invention relates to sensor devices for acquisition and characterization of data, including seismic information. More particularly, embodiments of the invention incorporate one or more sheets of piezo-electric material into a sensor to detect signals of interest, with the sensor having improved sensitivity, improved ruggedness and reduced size.

BACKGROUND OF THE INVENTION

There is a continued need to find improved ways to rapidly detect signals of interest, including signals providing data indicating the presence of human, animal or equipment activity. The earlier the detection and classification of events, the more time there is available to protect human beings and physical assets that may encounter threatening activities, e.g., military operations, border intrusions and trafficking of illegal goods. More timely responses can be had by reducing the time required for detecting and classifying signals of interest with minimum acceptable confidence levels.

Improvements in signal detection require finding practical ways to increase sensitivity of detectors deployed in field monitoring activities, i.e., to discriminate between low energy emissions and background noise. Improvements in classifying signals of interest can also result from improved detector sensitivity because larger amounts of data can be acquired from signals emerging out of background noise sooner. This can expedite meeting minimum acceptable confidence levels. In turn, this enables more rapid discrimination between similar source types. Reductions in system size and cost can enable more economical deployment of a greater number of sensors.

In the past it has been commonplace to employ multi-modal sensing schemes to characterize such activities of potential interest in an automated or quasi-automated manner. For example, it is conventional to combine different types of sensor systems to discriminate between source types. There may be acquisition of temperature information, infrared data and magnetic field data, in combination, to confirm the presence of a specific object such as a type of terrestrial vehicle. Such systems are complex and may be large.

As noted in U.S. Pat. No. 9,057,796 (the '796 patent), multi-modal sensing systems are not well-suited for rapid deployment, in part because they generally consume levels of power that make long term battery operation impractical. Typically, these systems have identified objects of interest on the basis of data matching where the source of a signal of interest, e.g., a moving motor vehicle, is in a class having a specified signature, and an image is acquired to accompany the multi-mode raw or extracted data. It has been a common approach to acquire time varying power density and spectral data associated with specific sources of seismic or acoustic energy and compare this acquired information with a fingerprint template for a specific vehicle type to determine whether the vehicle is, for example, a motor cycle or a large truck. Due to the varied nature of signatures within a category of vehicles (e.g., moving trucks), fingerprint matching techniques may have an unacceptably high rate of false detections, or they may fail to identify a vehicle as being in a suspect class.

Given the need to provide systems and methods which enable rapid detection of specific types of sources with high levels of confidence, the '796 patent teaches a sensor device that, instead of receiving signal information from a transducer element distinct from a piezoelectric cable, couples the piezoelectric cable directly with the seismic wave field. Such a device is referred to herein as a seismic-acoustic Piezoelectric Cable Sensor Device (PCSD). To effect this arrangement, instead of requiring that the cable be firmly mechanically coupled to a rigid transducer element, such as a cylindrically shaped wall, techniques are provided to establish stable positioning of the cable element along a supporting frame. The cable may be configured in accord with any of numerous configurations, including spiral arrangements such as shown in FIG. 3A of the '796 patent. In the past, piezoelectric cable has been suitable for many seismic field applications, e.g., underground positioning, when environmental conditions demand stabilizing the position of the sensor and protecting the sensor from damage. In fact, it was found that piezoelectric cable can be effectively secured to a stabilizing frame, and encapsulating the sensor material within a durable sheath assures a satisfactory level of robustness for reliable field operations. Nonetheless, the arrangement incidentally results in at least some mechanical coupling between the piezoelectric cable element and the frame. Fortunately, with the sensor primarily embodied as a wrapped cable, mechanical coupling of the cable with the frame could be sufficiently reduced that the predominant means for stimulating the cable with seismic energy could be the direct coupling of the cable with the seismic-acoustic wavefield. Mechanical coupling of the piezoelectric cable to the frame has been reduced by minimizing direct contact between the piezoelectric cable and the frame. Nonetheless, it is difficult to completely prevent transfer of all energy between the frame and the cable.

SUMMARY OF THE INVENTION

According to an embodiment of the invention, a sensing system is provided which is responsive to a wavefield of acoustic or seismic signals. The sensing system includes a piezoelectric foil layer having first and second opposing surfaces and is configured as a piezoelectric sheet. The system also includes a frame having a surface along or about which the piezoelectric sheet is positioned in a manner which provides the foil layer a stable shape while permitting the piezoelectric sheet to be responsive to a wavefield of seismic or acoustic energy. Coupling between the piezoelectric sheet and the frame is so limited as to render direct coupling of the piezoelectric sheet with signals of the wavefield the predominant means for stimulating the sensor element with seismic energy.

A method is also provided for forming a sensing system responsive to a wavefield of acoustic or seismic signals. The method includes providing a foil layer having first and second opposing surfaces and piezoelectric properties. The foil layer, configured as a sheet, is positioned along or about a frame surface which provides the foil layer a stable shape while permitting the sheet configuration of the foil layer to be responsive to a wavefield of seismic or acoustic energy. Coupling between the foil layer and the frame is so limited as to render direct coupling of the foil layer with signals of the wavefield the predominant means for stimulating the sensor element with seismic energy.

According to another embodiment of the invention, a method of forming a sensing system responsive to a wavefield of acoustic or seismic signals includes providing a foil layer having first and second opposing surfaces and piezoelectric properties. The layer is configured as a sheet. The foil layer is positioned along or about a frame having a surface which provides the foil layer a stable shape while permitting the sheet configuration of the foil layer to be responsive to a wavefield of seismic or acoustic energy. Coupling between the foil layer and the frame is so limited as to render direct coupling of the foil layer with signals of the wavefield the predominant means for stimulating the sensor element with seismic energy.

BRIEF DESCRIPTION OF THE DRAWINGS

Features, aspects, and advantages of the present invention will become better understood when the following detailed description is read with reference to the accompanying drawings, wherein:

FIG. 4 is an exploded view of the sensor device shown in the partial view of FIG. 3A;

FIG. 5 is a perspective view illustrating the exterior of the device shown in FIG. 3A;

FIG. 15 is a table further illustrating improvements in sensitivity of a sensor device according to an embodiment of the invention.

Like reference numbers are used throughout the figures to denote like components. Numerous components are illustrated schematically, it being understood that some details, connections and components of an apparent nature are not shown in order to emphasize features of the invention. Various features shown in the figures are not shown to scale in order to emphasize features of the invention.

DETAILED DESCRIPTION OF THE INVENTION

Before describing in detail particular embodiments of devices, systems and methods according to the invention, it is noted that the present invention resides primarily in a novel and non-obvious combination of components and process steps. So as not to obscure the disclosure with details that will be readily apparent to those skilled in the art, certain conventional components and steps have been omitted or presented with lesser detail, while the drawings and the specification describe in greater detail other elements and steps pertinent to a conceptual understanding of the invention. Further, the illustrated embodiments do not define limits as to the definition of any system or method according to the invention, but only provide examples which include features that are permissive rather than mandatory and illustrative rather than exhaustive.

Figure 1:
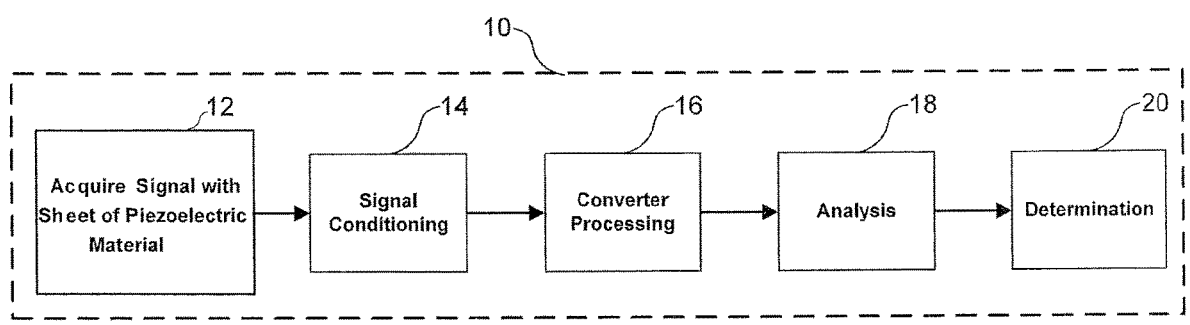
FIG. 1 illustrates, in simplified form, an exemplary process according to the invention for acquiring, detecting and classifying a signal of interest, with acquisition by direct coupling of a piezo-electric foil layer with a seismic-acoustic wavefield being the predominant means of sensing data.

With reference to FIG. 1 there is illustrated, in simplified form, an exemplary process 10 comprising acquiring, detecting and classifying a signal of interest. The term "signal of interest" refers to a signal which is often of a relatively a low power level, embedded within the ambient noise. If the signal is detected as data of potential interest, it can subsequently be classified as a signal of interest within a distinct group of objects for which the process is intended to identify members. Examples of such groups are footsteps, stationary electro-mechanical equipment, aircraft and various other types of vehicles.

The process begins with Acquisition 12 whereby a signal comprising seismic data is acquired with a sensor device. For the embodiments described in FIGS. 1 through 4, the sensor device is formed with a layer comprising piezoelectric material in a sheet configuration, also referred to as a sheet, having a relatively flat response in a frequency range extending from 2 Hz or less upward. The frequency response of the sensor device extends above 400 Hz and may extend into the kiloHertz range. In Acquisition 12 the data is sensed predominantly by direct coupling of a seismic-acoustic wavefield with the sheet comprising piezoelectric material. In embodiments of the sensor device the sheet comprising piezoelectric material extends along, or is wrapped about, a frame with little or no mechanical coupling between the sheet and the frame. Disclosed embodiments exhibit reduced or minimum mechanical coupling between the sheet comprising piezoelectric material and the frame while enabling manufacture of the assembly without customized tools. In certain embodiments the level of mechanical coupling between the sheet and the frame may be greater than an ideal minimum level of coupling, e.g., having no mechanical coupling to the frame. For example, in one series of embodiments, the sheet may be subject to some tensioning to increase signal response of the piezoelectric material that increases mechanical coupling between the sheet and the frame.

Other embodiments of a process and a system for acquiring, detecting and classifying a signal of interest may include a piezoelectric cable of the type disclosed in the '796 patent and, for those embodiments, the level of coupling between the cable and the frame may be greater than a minimum because the cable is subjected to some tensioning to adjust signal response, which tensioning may increase mechanical coupling between the cable and the frame. The acquired signal data undergoes Signal Conditioning 14 which converts charge separation due to the piezoelectric effect to an amplified voltage level, then filters and amplifies the signal, and provides level adjustments needed for further processing.

During Converter Processing 16 the conditioned signal is digitized into a stream of digital data suitable for analysis. The data stream provided by Converter Processing 16 is received for Analysis 18 which applies a set of criteria to segment the digitized data into frames for additional processing and to determine whether the data contain signals of potential interest. For example, each defined frame may contain a set number of data values captured during a defined time duration. A feature of the invention is that data frame size is a system control variable which may be adjusted for each process being performed. Thus multiple frames of differing lengths may be generated in parallel from a single digital data stream and then used in different processes. Similarly, the digital data stream may be decimated to appropriate rates during this segmentation process depending upon the processes to be performed. For example, the length of data frames and final sample rate may be customized for the initial detection of signals of potential interest as well as for each object classification, e.g., footsteps, or vehicles. As used herein, a signal of potential interest refers to a possible Signal of Interest (SOI). A Signal of Interest (SOI) is a signal which meets criteria for classification. A possible signal of interest is a signal which meets preliminary criteria used as indicators that a signal may be a Signal of Interest.

Summarily, the digital stream is formatted into frames prior to processing in conjunction with specific algorithms. The frames of data may overlap in time with adjacent frames or may be entirely distinct from one another. For example, algorithms used to classify a motor vehicle may format the data into frames of 1024 or 2048 values acquired during a period ranging from 500 to 1,000 ms. A frame may contain 2048 samples of data, each corresponding to measured values in the serial stream of digitized data. When a determination is made that a frame of data contains a signal of potential interest, two separate assessments can be made as to whether the signal of potential interest meets criteria for classification as a SOI. A first assessment can be provided to a remote station while data for performing a second, more extensive assessment are still being acquired. Cycle times for generating first assessments are faster than cycle times for generating second assessments, but the first assessments can have higher false alarm rates than the second assessments because they are based on less data than the second assessments. Nonetheless, first assessments provide early warnings regarding potential existence of SOI's.

A feature of the embodiments having a sensor comprising a foil layer (also referred to as a sheet or a foil) of piezoelectric material is an increased sensitivity relative to that observed with a sensor comprising a piezoelectric cable such as disclosed in the '796 patent. The greater sensitivity of a design comprising a sheet of piezoelectric material, relative to the cable format as disclosed in the '796 patent, enables an earlier completion of alerts or assessments described herein, and a reduction in false alert rates. The significantly smaller size of a sensor device utilizing a foil sensor rather than a cable sensor enables smaller sensor system size and weight, which is a distinct advantage for some applications, such as applications requiring portable, man-carried security systems. The foil sensor is also significantly less expensive to purchase than the length of piezoelectric cable required for sensor fabrication.

The first and second assessments are each based on characteristic features derived from known SOI's, either over a single frame or over multiple frames of data. The characteristic features comprise sets of information useful for classifying the data of interest into one or more distinct groups of objects. The results of these assessments are used to make a Determination 20 which provides indications whether or not signals of potential interest meet threshold criteria for classification as particular types of SOI's. The Analysis 18 indicates whether the acquired data suggests one or more specific classifications and the Determination 20 indicates that one or more threshold criteria are met which establish a minimum confidence level that the assessment is correct. The threshold criteria are system control variables that may be adjusted independently for each process or specific classification.

With imposition of pre-specified criteria, the Analysis 18 and Determination 20 result in: (a) a conclusion that a signal of potential interest is a SOI that is a member of a particular class of objects; or (b) a conclusion that the signal of potential interest is not a SOI. Each conclusion is accompanied by a confidence level.

The first assessment, being based on a limited set of data (e.g., one frame of 2048 values) and feature information derived from the data, provides a preliminary conclusion on classification. That is, an inference about SOI classification can be provided at a predetermined, minimally acceptable confidence level for the purpose of generating a short term Warning. The Warning is useful during the period in which other segments of data acquired by the sensor are being processed to generate the second assessment.

According to embodiments of the invention, a sequence of second assessments is generated as additional frames of data are incorporated into the analysis process with previously acquired data frames. With the cycle time of the second assessment spanning a time period in which (i) multiple frames of data are collected, (ii) more extensive data is used to calculate metrics, or (iii) additional metrics are calculated: the second assessment provides determinations at a higher level of confidence than the determination generated by the first assessment. With the confidence levels of more recent assessments in the sequence being greater than confidence levels of earlier assessments in the series (i.e., because more information is available in the later analyses), an Alert, indicating a conclusion drawn about classification, is generated as an output of the second assessment as soon as the confidence level reaches a threshold level for a given classification. For a given classification, the number of frames of data required to reach the threshold level of confidence may vary based on, among other factors, signal strength and signal type. Levels of confidence used as threshold criteria are system control variables that may be adjusted independently for each process or specific SOI classification.

Figure 2:
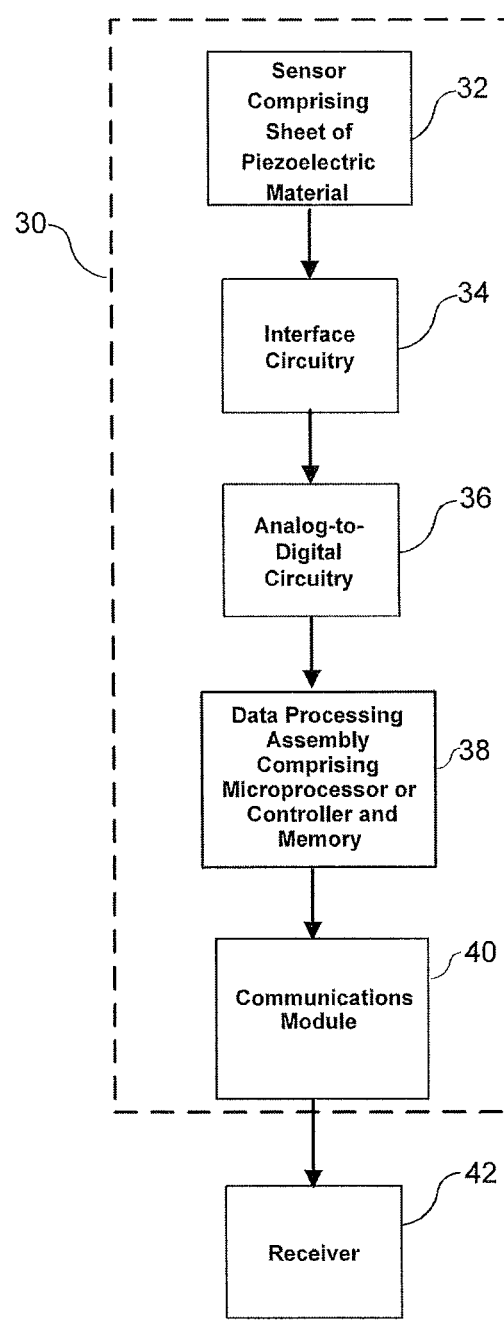
FIG. 2 illustrates general features of an exemplary detection system based on a sensor device comprising a foil layer of piezoelectric material with which the process of FIG. 1 can be performed.

FIG. 2 functionally illustrates an exemplary detection system 30 with which the process 10 for acquiring, detecting and classifying a signal of interest may be performed. A sensor device 32 or 33 acquires seismic and acoustic data predominantly by direct coupling between a sheet comprising piezoelectric material and a wavefield. The acquired data is sent to interface circuitry 34 for conditioning. The analog signal is then received by Analog-to-Digital (A/D) Circuitry 36 which converts the signal into formatted frames of digital data. A Data Processing Assembly 38 receives the digitized data to perform Analyses 18 and provide a Determination 20 as described with respect to FIG. 1.

For each first assessment and second assessment the assembly 38 outputs a Determination 20 as to whether the acquired data constitute a SOI. Each Determination is based on (1) criteria corresponding to one or more specific classifications and (2) a requirement that the level of confidence of the associated assessment, that a valid conclusion has been drawn, exceeds a threshold level of confidence criterion. A communications module 40 is configurable to receive and transmit the Determinations 20 via a designated mode to a receiver 42 such as a handheld device or a base station located at a position remote from the sensor device 32 or 33. The communications link between the communications module 40 and the receiver 42 may be via an Ethernet connection, a radio link or other suitable mode.

Figure 3A:
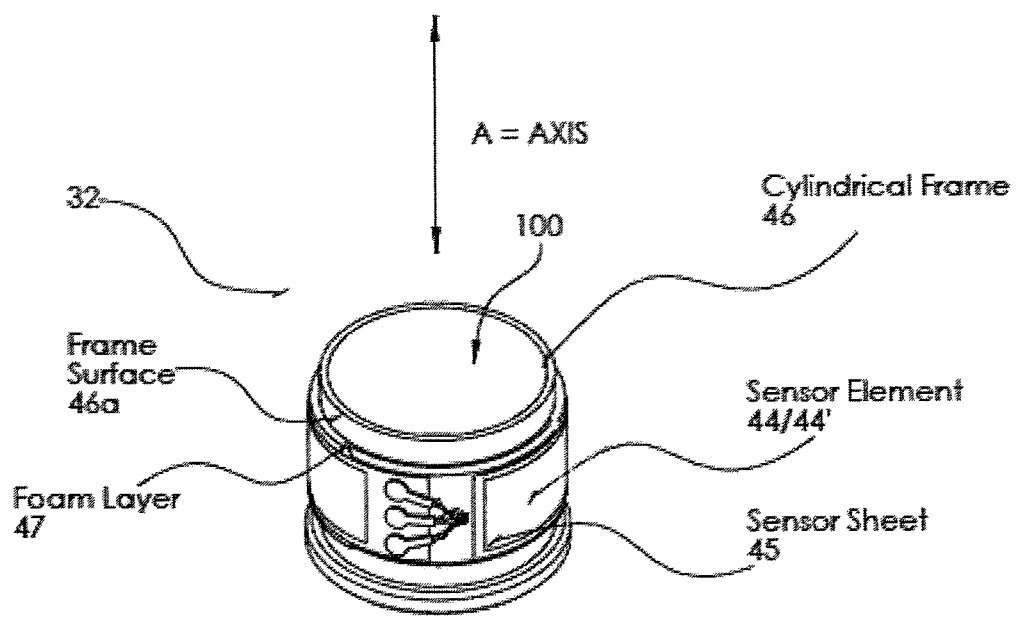
FIG. 3A is a partial perspective view of an embodiment of the sensor device formed with a layer having a sheet configuration comprising piezoelectric material according to an embodiment of the invention.
Figure 3B:
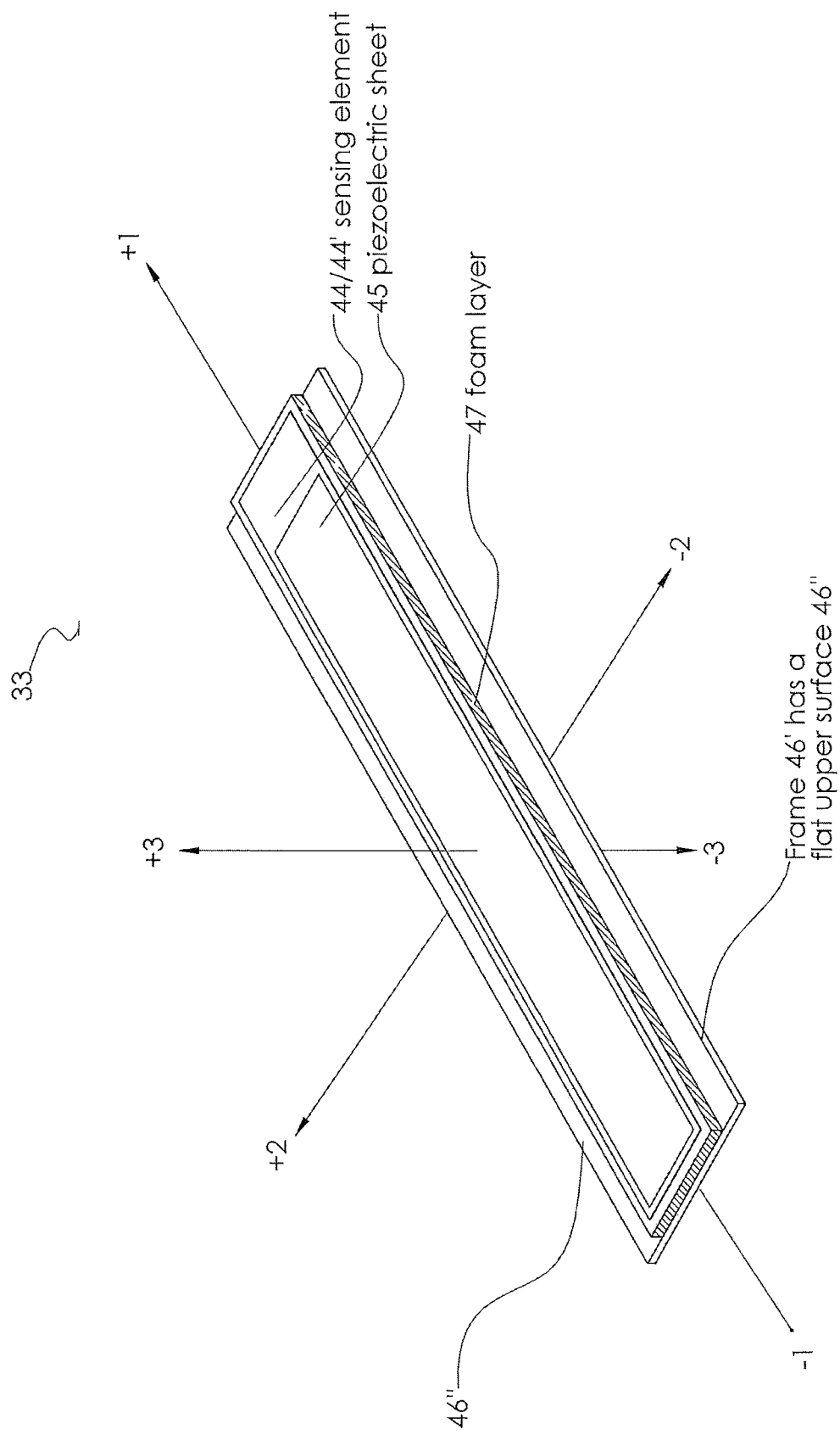
FIG. 3B is a perspective view of another embodiment of the sensor device also formed with a layer comprising piezoelectric material and having a sheet configuration according to another embodiment of the invention.

FIG. 3A is a simplified illustration of a sensor device 32 according to an embodiment of the invention suitable for incorporation into the detection system 30. FIG. 3B is a simplified illustration of a sensor device 33 according to another embodiment of the invention also suitable for incorporation into the detection system 30.

The sensor devices 32 and 33 each comprise at least one piezoelectric signal sensing element 44 or 44' positioned about a support structure, generally referred to as a frame. Although the following discussion references the element 44, it will be recognized by those skilled in the art that many of the described features are applicable to the element 44'. A first exemplary frame 46 is illustrated in FIG. 3A and a second exemplary frame 46' is illustrated in FIG. 3B. Each signal sensing element 44 or 44' includes a multi-layered piezoelectric sheet 45 or 45' comprising the piezoelectric material and associated wiring and electrical connectors for integration with system electronics.

The frame 46 of the sensor device 32 illustrated in FIG. 3A is in the form of a generally tubular body formed about a central axis, A, and having a chamber 100 therein. The illustrated body shape of the frame 46 includes a cylindrically shaped exterior surface 46a, although a variety of symmetric and asymmetric shapes are suitable. The piezoelectric sheet 45 of the sensor device 32 is positioned along the exterior surface 46a of the frame 46 to assume the exemplary body shape of the frame 46, e.g., a substantially cylindrical shape. In the illustrated embodiments a layer 47 of closed-cell foam material (for example, a ³⁄₃₂" thick×1" wide silicone foam strip with adhesive on one side, part #5109K25, from McMaster-Carr Supply Company, Elmhurst, Ill. USA), is positioned between the surface 46a and the sheet 45. More generally, the layer 47 has a lower Young's modulus than that of the frame 46 which is relatively rigid while the layer 47 is more easily deformable.

The frame 46' of the sensor device 33 illustrated in FIG. 3B is a body having a generally flat surface extending along a plane. The piezoelectric sheet 45 of the sensor device 33 is positioned along the flat surface 46" of the frame 46' to assume a flat shape. Embodiments of the invention may advantageously include an intermediate layer 47 of closed-cell foam material, e.g., the above-referenced silicone foam strip from McMaster-Carr Supply Company, positioned between the surface 46" and the sheet 45.

The intermediate layer 47 is advantageously placed in the sensor device 32 to separate the piezoelectric sensing element 44 from the relatively rigid frame 46'. Intermediate layer 47 facilitates providing two sensing element advantages. First, when positioned about the layer 47, the sensing element 44 was determined to perform better when under post manufacture tensioning along its length, i.e., tensioning the piezoelectric material during assembly of the sensor device. Second, the sensing element 44 was determined to perform better when not tightly coupled to the underlying rigid frame 46'.

Tensioning the sensing element 44 during fabrication of the sensing device without the intermediate layer 47 positioned as a standoff material between the sensor sheet 45 and the frame surface 46 would couple it tightly against the rigid frame. Use of the layer 47, as a standoff material simultaneously allows tensioning without requiring tight coupling of the sensing element to the rigid frame. Physical properties of the intermediate layer 47 were chosen such that the layer 47 remains elastomeric in nature over the temperature and stress ranges of interest. That is, the layer 47 acts elastomerically and not, for example, as a brittle glass. As a result, the layer 47 can serve as an effective standoff that sufficiently reduces mechanical coupling for the sensing element over the natural and stress environments of interest for sensor device 32.

In the illustrated embodiments, the intermediate layer 47 functions to so limit mechanical coupling between the sheet and the frame as to render the direct coupling of the sheet with the wavefield the predominant means for stimulating the sensor element with seismic energy. The intermediate layer may, for example, be characterized by a lower Young's modulus than that of the frame 46 which is relatively rigid, while the layer 47 is more easily deformable. The intermediate layer may comprise a closed-cell foam material or a silicone foam material. The intermediate layer may be characterized by a higher level of compressibility than a portion of the frame along which the intermediate layer is positioned.

Post manufacture tensioning of the foil layer about the intermediate layer is one method of increasing sensitivity of response of the foil layer to a signal in the wavefield while the intermediate layer functions to so limit mechanical coupling between the foil layer and the frame as to render the direct coupling of the sheet with the wavefield the predominant means for stimulating the sensor element with seismic energy.

Figure 3C:
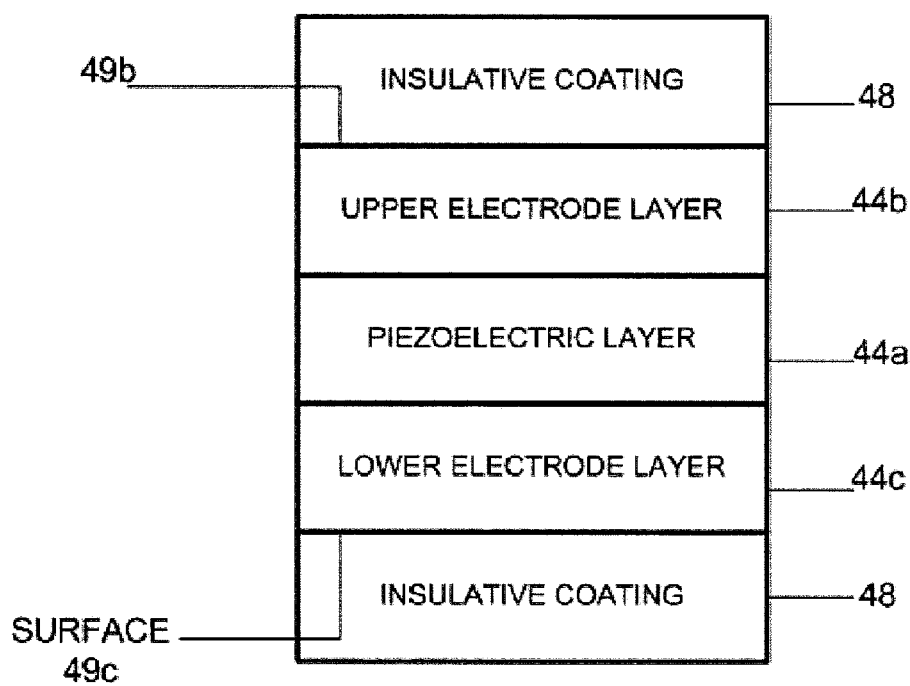
FIG. 3C is a view in cross section of a layer of foil comprising piezoelectric material and having the sheet configuration shown in FIGS. 3A and 3B, illustrating sublayers thereof according to a first embodiment of the layer.

For an embodiment illustrated in the edge view of FIG. 3C, laminations in the sheet 45 include a layer 44a of piezoelectric polymer material, or a composite comprising piezoelectric polymer material, positioned between an upper conductive electrode layer 44b and a lower conductive electrode layer 44c, which serve as upper and lower electrodes. The exemplary layer 44a of piezoelectric material comprises the polymer polyvinylidene fluoride (PVDF) and may be a copolymer of PVDF. The electrode layers 44b and 44c and associated electrode terminals of the sensing element 44 may be formed of various conductive materials, such as copper, silver, aluminum or nickel by, for example, evaporative deposition, sputtering, and screen printing. As noted below, the conductive layers 44b and 44c may be coated with an insulator or with an insulative protective layer, e.g., an acrylic, a resin based material or an epoxy material. Piezo-electric sheets 45 as illustrated in FIG. 3C are available from Measurement Specialties, Inc. of Hampton Va., USA and its European operation, MEAS Deutschland GmbH located in Dortmund, Germany.

Figure 3D:
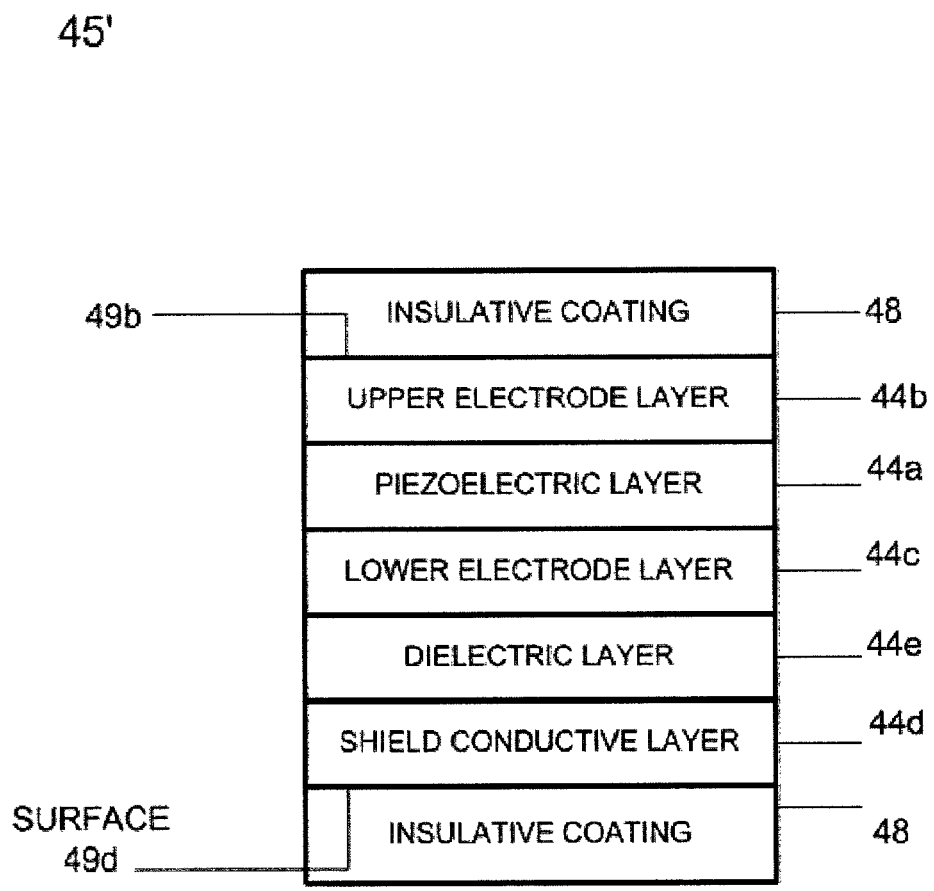
FIG. 3D is a view in cross section of a layer of foil comprising piezoelectric material and having the sheet configuration shown in FIGS. 3A and 3B, illustrating sublayers thereof according to a second embodiment of the layer.

FIG. 3D illustrates an alternate embodiment of the invention where like reference numbers in FIG. 3C denote like features in FIG. 3D. A sensing element 44' is used in lieu of the element 44 in the device 32 and the device 33. In addition to the upper electrode layer 44b and lower electrode layer 44c, the sheet 45' of the sensing element 44' further includes an additional, third, conductive layer 44d electrically isolated from the conductive layer 44c by an intervening insulative layer 44e. The insulating layer 44e may be a deposited material and the conductive layer 44d may be formed with a method described for the layers 44b and 44c.

For the sensing elements 44 and 44', an insulative coating material 48 is formed over the exposed conductor surfaces of the sensing element conductors (e.g., over a surface 49b of conductor 44b, and over a surface 49c of conductor 44c in FIG. 3C; or, as shown in FIG. 3D, over the surface 49b of conductor 44b, and over the surface 49d of conductor 44d). The insulative coating material 48 is also formed over otherwise exposed edge surfaces of the conductors, e.g., 44b, 44c and 44d (not shown) to provide a seal coating.

In principle, for the sensor devices 32 and 33, when the sheet 45 is deformed, e.g., due to a strain or compression, a charge separation occurs in proportion to the level of strain or compression. Circuitry coupled to the upper electrode layer 44b and the lower electrode layer 44c registers the charge separation as a voltage.

In the past, piezo-electric foil sheets have been used as sensing elements in a variety of applications such as actuators, switches and impact sensors. Operation of such devices differs from operation of embodiments according to the invention, in part because the sheet 45 couples directly with seismic-acoustic wave fields to detect seismic-acoustic signals of interest.

Moreover, for embodiments of the invention, direct coupling between the sensing element 44 and a seismic-acoustic wave field is the predominant path of sensing seismic-acoustic signals while other paths of stimulation may be more limited or absent. The electrical response of a piezo-polymer material, such as polyvinylidene flouride (PVDF), is anisotropic, meaning that the electrical response depends on the magnitudes and directions of the strain field experienced within the piezoelectric material. For this reason among others, it is important to design a sensor system with knowledge of the material properties and construction of the sensing element. This anisotropic response is primarily dependent upon the vector strain field the sensing element experiences based on incidence of the mechanical elastic seismic wave and the geometry of the sensing element.

It is important to note that all strains experienced by the sensor are infinitesimal, i.e., of such small magnitude they are amenable to description using the methods of continuum mechanics. Therefore relationships, such as Hooke's Law, apply to relate stress, a vector field of forces, and strain, a vector field of displacements. While Hooke's Law relates the stress and the strain within the continuous media, additional constitutive equations are required to describe the anisotropic response within the piezoelectric sensing element that results in a charge separation proportional to the experienced external strain field.

Within the PVDF piezoelectric element, the three Cartesian coordinate system directions of X, Y, and Z are usually represented by the index subscripts 1, 2, and 3 respectively, as shown for the sheet 45 of piezoelectric material shown in FIG. 3B. The three directions are generally intimately related to the underlying orientation of molecules within the material of the sheet 45, depending upon the manufacturing process. In sheets of piezoelectric polymers such as PVDF, manufactured to a uniaxial characteristic, the X or 1 direction is tightly controlled by the manufacturing process and is also in the direction of stretch of the continuously rolled film (see *The Applications of Ferroelectric Polymers* by Wang, T. T., J. M. Herbert, and A. M Glass, eds. Chapman and Hall, New York. 1988).

In the case for which the sheet is in the profile of a rectangle or a long strip of tape with a very small thickness (e.g., having a large length compared to a relatively smaller width dimension and a thickness several orders of magnitude less than the lateral dimensions), the 1 direction is usually the direction along the longer length dimension of the sheet as is shown in FIG. 3B, and the axis of the PVDF molecule is oriented along the 1 direction. For the film to have an optimized and predictable piezoelectric response, it must be poled in a strong electric field as part of the manufacturing process. The direction of poled polarization is usually made to coincide with the Z-axis or 3-axis of the Cartesian tri-axial system, and this Z-axis is generally the direction coinciding with the thickness of the sheet, i.e., the direction perpendicular to the major plane along which the sheet of material extends.

The relationship between the experienced strain and the charge separation generated by the piezoelectric material takes the form of a complex constitutive equation which may be simplified to a linear piezoelectric equation of state (e.g., see *Piezoelectric Sensorics: Force, Strain, Pressure, Acceleration and Acoustic Emission Sources, Materials and Amplifiers* by G. Gautschi, Springer-Verlag, New York, 2002). Keeping in mind that Hooke's law relates strain and stress, the magnitude of polarization induced in a piezoelectric material for an applied strain then is the product of the internal stress and a constant of proportionality called the piezoelectric charge constant, d. The piezoelectric charge constant, d, is defined as the induced polarization per unit of experienced mechanical stress and takes the form of a matrix of values due to the anisotropy of the material generally denoted as $d_{ij}$. Of the two subscripts, the first usually indicates the direction in which the polarization is generated or the normal to the surface that the induced polarization is measured or is the polarization in the piezoelectric material when the electric field is zero. The second subscript is then the direction of the induced strain, or is the direction of the applied stress, respectively. Further description can be found in *Piezo Film Sensors Technical Manual* P/N 1005663-1 REV E 25 Mar. 2008 available from Measurements Specialties Inc., Hampton, Va., Wang et al 1988, and Gautschi 2002.

The coefficient $d_{33}$ is the induced polarization in direction 3 (parallel to the direction of polarization) per unit stress applied in direction 3, and measured using electrodes applied on the surfaces perpendicular to the 3 axis. For a cable, as illustrated in FIG. 4 of the '796 patent, this is the radial direction with respect to the central conductor of the cable. For the sheet 45 shown in FIG. 3B, this is along the 3 direction.

The coefficient $d_{31}$ is the induced polarization in direction 3 per unit stress applied in direction 1. For a uniaxial film the $d_{31}$ coefficient is generally large, but smaller than the $d_{33}$ coefficient and of opposite sign. The coefficient $d_{32}$ is defined in a manner similar to that of the $d_{31}$ coefficient except that the induced polarization is in the 2 direction. For a uni-axial film the $d_{32}$ coefficient has a much smaller magnitude than $d_{31}$ and is of opposite sign to $d_{33}$. As used herein the term "plane" may refer to a flat plane, a cylindrical surface, a spherical surface or other surface having a curved shape.

When reference is made to a direction along a curved surface the direction is understood to be that defined by a vector tangent with the surface. For example, when the sheet 45 conforms to the cylindrical surface 46a of the sensor device 32, the perpendicular relationship between the 1, 2 and 3 directions is defined at a point along the surface of the sheet 45 by the tangent vectors and the normal vector.

To summarize, taking into account the structure of the d matrix for PVDF, "Net polarization exists only in the 3 direction so no change in charge would be expected on surfaces 1 and 2 when the film is subjected to uniaxial stress in the 1, 2, or 3, directions. The '3' surface is the one where electrodes are usually placed and the $d_{3j}$ components are most frequently reported." See Wang at p. 55.

The combination of the coefficients $d_{31}+d_{32}+d_{33}$ is known as the hydrostatic response coefficient and is noted as $d_{3h}$. Because, in general, $d_{31}$ and $d_{33}$ are of opposite sign, and $d_{33}$ is the larger coefficient, $d_{3h}$ is smaller in magnitude than $d_{33}$. Additional information regarding equations of state and properties of PVDF can be found in "Measurements and Properties of Ferroelectric Polymers" by Furukawa, in Wang et al 1988.

For the illustrated embodiments, the piezoelectric sensor device 32 shown in FIG. 3A is constructed using the sheet 45 of PVDF material. In these applications the sheet 45 responds to finite quasi-static strains. Examples are weigh-in-motion systems and perimeter monitoring. With the sheet 45 buried under a roadway or other ground mass, a signal is generated when a force is transmitted from above and through the ground medium to the sheet. When the sheet experiences the force, e.g., a compressive force, a transient charge displacement is generated in response thereto. In the weigh-in-motion example, the force resulting from the weight of a vehicle passing over the cable causes a physical compression of the sheet proportional to the weight of the vehicle. In the context of perimeter monitoring, movement of a person, e.g., footsteps, or movement of a vehicle, inject impulsive transient, variable, or continuous seismic wave energy into the ground. This energy propagates to the sensor location as a seismic wave field. The sheet experiences the compression and rarefaction associated with the wave field, which generates a transient charge separation.

With the sheet 45 mounted to a tubular shaped support structure, referred to as the base or frame 46, the sensor device 32 provides unexpected and improved performance over that previously observed with piezoelectric sensors, including sensors made with piezoelectric cable.

It was recognized in the '796 patent that response of a seismic sensor formed with piezoelectric cable, e.g., the PCSD, could be observed when the spiral wrapped cable element coupled directly with the seismic wave field. Based on current understandings of how piezoelectric foils respond to signals, including results reported in the literature, there was no reason to expect a piezoelectric foil applied in sheet form (as illustrated in FIG. 3), to provide comparable sensitivity to that of a sensor comprising a piezoelectric cable. In fact, the inventors are not aware of any theory in the open literature to explain an unexpected finding: that a piezoelectric foil can provide improved sensitivity over a design comprising a piezoelectric cable as taught in the '796 patent, e.g., a PCSD. Relative to the PCSD, improved sensitivity was observed with the sensor device 32.

Figure 14:
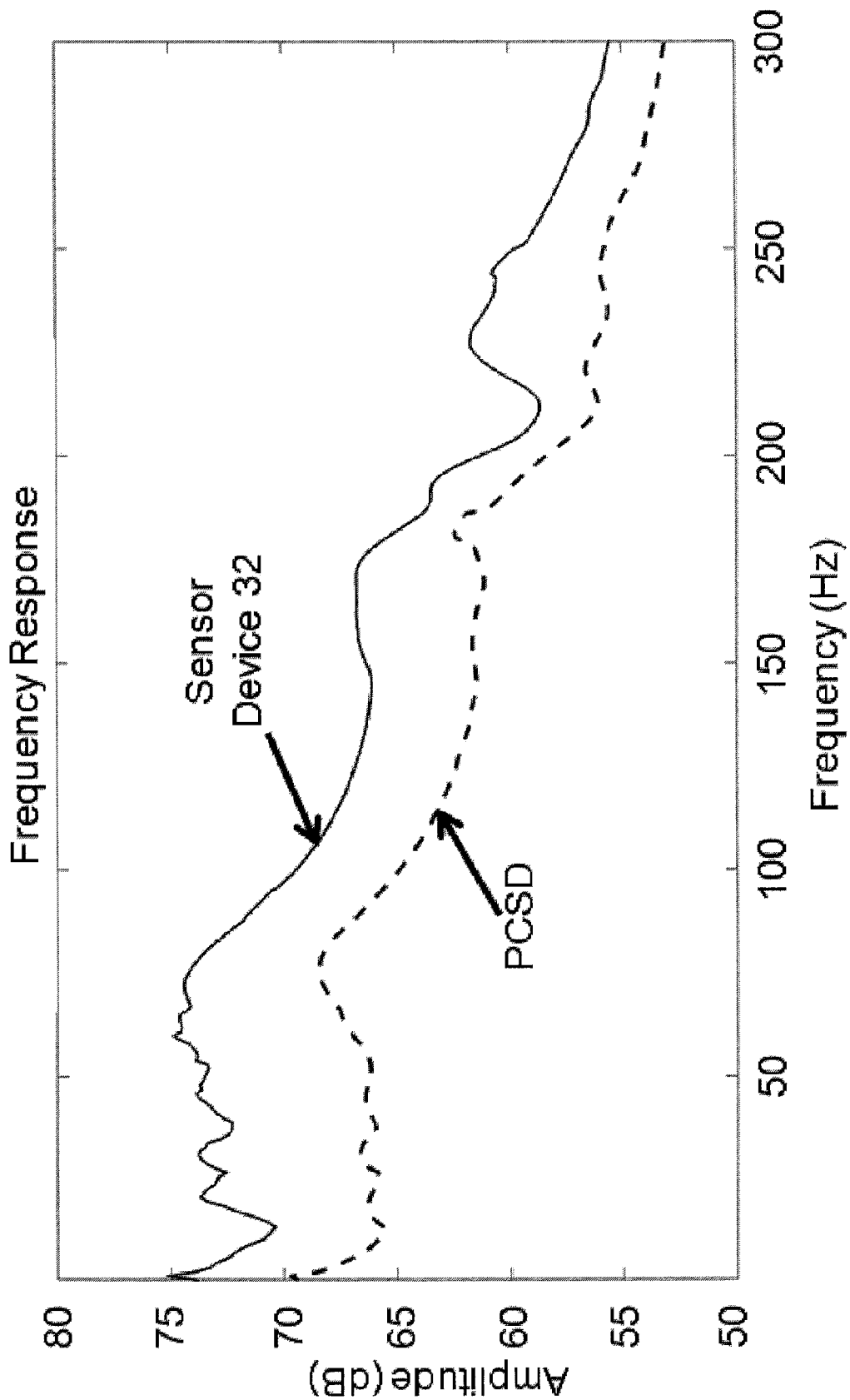
FIG. 14 illustrates improved frequency responses of a sensor device according to an embodiment of the invention.

FIG. 14 illustrates a qualitative comparison between the frequency responses of the sensor device 32 and the PCSD, indicating that the sensor device 32 comprising the foil layer 44 (sheet configuration) was more sensitive to vibration signals at most frequencies of interest for seismic acoustic intrusion detection systems. Exemplary improvements in sensitivity are listed in the table of FIG. 15. In multiple trials, an intrusion detection system based on the sensor device 32 routinely detected, classified, and reported footsteps when the sensor device 32 was approximately twice as far from the source as was the PCSD. Based on the range of sensitivity to signals of interest systems utilizing foil sensors outperform systems utilizing cable sensors.

In the past, when using a flat sheet of piezoelectric foil comprising PVDF polymer in the configuration of a laminated sensor element, it has been conventional to mechanically couple multiple sensor elements to a solid base, e.g., even to the extent of applying a bonding agent at the interface between an element and the base. Such a sensor assembly was previously created on a base of approximately 15 cm×22 cm with a total active piezoelectric foil area of 117 $cm^2$, and then including an additional covering layer for mechanical protection. As reported in the literature, such a sensor assembly, without any additional electronic components, was buried horizontally, provided with an overburden of 21 kg, and wired to additional electronic components comprising off-the-shelf data acquisition equipment at a short distance from the installed sensor assembly. This configuration was found useful and satisfactory for monitoring concrete underground drain pipes at ranges of less than 3 meters. See Cechak, "Detection of the Under-soil Intruder Activity", Proc. of SPIE Vol. 6562, 656210-1 to 656210-12 (referred to herein as the SPIE Document). The operation of numerous other devices for signal and motion detection has been based on similar types of coupling to piezoelectric foils. In summary, for seismic sensing with a piezoelectric foil, one or more conventional arrangements have reportedly enabled the foil to provide a satisfactory response primarily in the $d_{33}$ mode to detect seismic energy traveling through the solid material (known as seismic body waves) from a source at a depth of approximately two to four meters, but also to limit or filter the response of the sensor to seismic surface waves. Cechak's construction yields a directional accelerometer, which is fundamentally different and less effective than the disclosed architecture, which measures strain rate omnidirectionally.

As described in the SPIE Document the effectiveness of deploying a piezoelectric foil was demonstrated to detect seismic energy by (i) bonding a lower face of the piezoelectric foil to a base; (ii) covering the opposing upper face of piezoelectric foil with an additional foil to provide protection from mechanical damage; (iii) burying the assembly disposed in a horizontal orientation with respect to the horizontal ground plane; and (iv) enhancing coupling with the surrounding environment (e.g., above and below the sheet), i.e., by applying an overlying weight. See the SPIE Document at page 656210-5. Based on the reported observations, it appears that coupling of the piezoelectric sheet, to move in concert with rarefaction and compression of the surrounding or adjoining medium, induces sufficient strain to generate substantial measurable electrical responses in the foil of piezoelectric polymer material based on the direction of the mechanical strain field with respect to the orientation of the piezoelectric material. Numerous other piezoelectric devices available from Measurements Specialties Inc., Hampton, Va. are known to operate in a manner consistent with the above-described arrangement (e.g., accelerometers) and it is generally understood that a component mode of a $d_{3h}$ response can be suitably sensed for purposes of detection.

However, tests performed with a device based on this conventional design approach (i.e., placing a foil comprising PVDF against a cylindrical shaped base acting as a transducer, in a manner consistent with teachings in the SPIE Document) were unsuccessful at acquiring seismic signals from sources at greater ranges (more than 10 meters) including both body waves and surface waves. After observing this failure, experiments were undertaken which departed from the conventional approach. The experiments resulted in a finding of both an improved sensitivity and an improved signal to noise ratio relative to the PCSD.

In contrast to this, the prior tested device, having PVDF placed against a cylindrical shaped base, in accord with the conventional design approach, did not provide a response to a seismic signal at any usable levels at any ranges greater than that reported in the Cechak report. While the conventional design approach had been demonstrated to provide a voltage response to an input of seismic energy, it was not expected, when the foil was placed against a rigid cylindrically shaped base, that the response would not be observable relative to a noise floor. Nor was it expected that, by decoupling a foil from a base, a functioning device would result having better performance than attained with the PCSD.

It would not be expected that sensing with a sheet comprising piezoelectric polymer would be superior to the benefits attained by sensing with a piezoelectric cable. With respect to the PCSD, three observations were had:

1. The existing cable-based sensor is constructed with a length L=6 meters of doubly spiral-wrapped piezoelectric coaxial cable manufactured by MSI. The inner conductor has a diameter $D_i$=0.102 cm as measured and as reported by MSI, and the outer jacket has an inner diameter $D_o$=0.117 cm. The inner conductor of the cable forms one of the electrodes for measuring the induced polarity of the cable and has a surface area of approximately $A_i=\pi D_i L=192.3$ cm$^2$. The braided shield of the piezoelectric coaxial cable forms the other electrode and has a surface area of about $A_i=\pi D_o L=220.5$ cm$^2$. This area is important because the electric flux density D in the piezoelectric element is proportional to the active part of the element, and the polarization charge Q on the electrodes is obtained from combining D with the physical dimensions of the electrodes (see Gautschi 2002, page 78). We approximate the applied stress T as a uniform pressure $F/A_a$ distributed evenly over the element acting on the surface of the element, having area $A_a$, to compress the piezoelectric element uniformly. Then the stress is homogenous throughout the piezoelectric element and thus through the direct piezoelectric effect a homogenous polarization is produced, generating an electric flux density of $$D_3 = d_{3X} T_X = d_{3X} F / A_a$$

The polarization charge, Q, on one of the electrodes is obtained by multiplying the electric flux density D by the area of the electrode $A_e$ such that $$Q = d_{3X} F A_e / A_a$$

If the area of the electrode is the same as the area that the force is acting over, then that area drops out of the equation and $Q = d_{3X} F$.

For a given capacitance, C, the relationship between charge and voltage is:

$$V = Q/C$$

Combining these equations provides the standard result that the electrode-to-electrode potential difference V for a capacitative piezoelectric sensor experiencing a homogenous force F is given by $$V = d_{3X} F / C$$

If the area of the electrode is larger than the area of action, then $A_e > A_a$, and part of the electrode simply ends up acting as a passive capacitance; the total charge Q is reduced and likewise the voltage, V, is reduced. If the area of the electrode is smaller than the surface area of the piezoelectric material but still in electrical communication with the whole of the material, then the charge may be concentrated in the electrode and the result will be a relative increase in the charge, Q, and likewise the voltage, V.

Electronically, the 6 m piezoelectric cable length used in the PCSD had a typical capacitance of 0.95 nanofarad per meter, or a total capacitance of 5.7 nanofarads. The foil sensor has a capacitance of approximately 11.0 nanofarads. From $V=d_{3X}F/C$, the larger the capacitance value, the lower the voltage should be for the same vibrational stimulus to the sensor. The calculation indicates that the PCSD should have about twice the response and sensitivity as the foil sensor. However, that was not the case.

2. Some arguments can be made for why the noise from the cable sensor element is expected to be small compared to the foil sensing element 44, 44', and why the observed relative sensitivity of the foil sensing element 44, 44' is unexpected. Because the total area of the cable element is relatively large (between ~190 and 220 cm$^2$), the expectation is that this larger area will aid in averaging out random fluctuations. In fact, for the standard DT foil sensing element 44, 44', with electrode dimensions of 1.91 cm×15.54 cm and total piezoelectric material area of 29.7 cm$^2$, the cable sensor exceeds the amount of active PVDF area compared to the foil sensing element by nearly an order of magnitude. This extra area in theory should reduce self noise by averaging out the effects of Brownian noise or Johnson noise (thermal electronic noise). The end result would be a lower variance in the voltage output at the analog interface circuit. In terms of averaging out real fluctuations due to non-coherent environmental seismic noise, the sensor system using the cable element exceeds the 1.91 cm×15.54 cm length and width dimensions of the foil sensing element. In other words, the 6 m cable sensor element samples a larger spatial dimension of the seismic strain field than does the foil sensing element. The net result of sampling over the larger spatial dimension should, in theory, be to reduce the variance of the coherent signal by averaging out non-coherent fluctuations. Yet the foil sensing element 44 was found to deliver lower background noise.

3. While the sensor device 32 was expected, overall, to exhibit a lower sensitivity due to the smaller operative surface area of the piezoelectric polymer, the sensor 32 actually exhibited a higher sensitivity than the PCSD despite the PCSD having a larger surface area of piezoelectric polymer. Comparatively, the sensor element 44 incorporated 29 cm$^2$ of piezoelectric material while the PCSD incorporated a six meter cable having 221 cm$^2$ of piezoelectric material adjacent the outer cylindrical capacitor electrode and 192 cm² of piezoelectric material adjacent the inner cylindrical capacitor electrode.

Such improvements in sensor response were not anticipated to result from a transformation between the spiral wrapped polymer sheet of the PCSD and application of the piezoelectric material as either a flat sheet or a sheet placed about a cylindrical body such as the frame 46. Thus, the present invention marks a departure from prior understandings of how to enhance the responsiveness of a piezoelectric foil and, specifically, the principles by which both sensitivity and signal to noise ratio of piezoelectric polymer materials are enhanced. For example, it had been recognized, in accord with the '796 patent, when a sensor device behaves as a point receiver (i.e., over a limited range of frequencies) provision of a large length of piezoelectric cable (and thereby a relatively large surface area of piezoelectric material), in a relatively small volume enhances cancellation of random noise. Design had also been based, in part, on electrical properties relating to device capacitance, whereby sensitivity of a piezoelectric sensing device is inversely proportional to the thickness of the included piezoelectric layer between an electrode pair.

Comparisons were made between (i) performance of the PCSD, in accord with the teachings in the '796 patent, and (ii) performance of multiple sensor devices each comprising a sheet of piezoelectric material of varying thicknesses. It was found that devices comprising a sheet of piezoelectric material exhibited a higher signal to noise ratio than attained with the PCSD, the PCSD having been designed to maximize signal to noise ratio.

Improved performance relative to the PCSD was observed for the sensor device 32 without the device using mechanical coupling as a primary means of transferring a signal to the sheet of foil. It was learned that, for a sheet comprising piezoelectric polymer, it is not necessary to provide a distinct transducer element, such as a rigid base, through which energy is first acquired from a ground medium and then transferred to the piezoelectric foil. Contrary to findings reported in the SPIE Document, the response of a foil, e.g., the sheet 45, can be predominantly based on direct coupling with the wave energy, instead of requiring transfer of wave energy through a distinct transducer element to the sheet 45. Based on distinctions noted above between the PCSD and a sheet comprising piezoelectric polymer, the results observed with the sheet cannot be predicted based on effects observed with the PCSD. In part, this is because the sheet comprising piezoelectric polymer (i) provided substantial signal when coupled to a base as reported in the SPIE Document, (ii) provided essentially no signal when coupled to a cylindrically shaped base, and (iii) provided superior signal sensitivity relative to the PCSD when incorporated in the design of the sensor device 32. As best understood, such variations in performance cannot be predicted based on previously observed parametric variations affecting performance of a piezoelectric cable spiral wrapped about a frame. As noted above, due to (i) geometric differences in how the piezoelectric material is configured, (ii) influence of the specific sensor design on responsiveness of the sheet to each of the d31, d32 and d33 modes, (iii) influence of total cable length or total sensor area on the signal to noise ratio, and (iv) interdependence of the foregoing variables: variations in performance of a sensor device formed with the sheet 45 could not be predicted simply based on performance data acquired for the PCSD.

For the illustrated embodiments the sheet 45 was secured to the extent necessary to establish stable positioning along a base or frame member. However, unlike the PCSD, many field requirements of the sensor devices 32 and 33, e.g., underground positioning with stability under environmental conditions, demand a more rugged and durable securement to stabilize a sheet of piezoelectric film. This may incidentally, but necessarily, create mechanical coupling between the sheet 45 and the frame 46.

However, as now understood, sensitivity of each of the devices 32 and 33 does not result directly from limiting mechanical coupling of a frame 46 with the sheet 45 but, rather, from the extent to which the sheet 45 is responsive to wave energy which impinges directly on a surface of the sheet. Limiting mechanical coupling between the piezoelectric sheet 45 and the frame 46 of the devices 32 and 33 may be a consequence of a design which permits the sheet 45 to receive, and be relatively more responsive to, wave energy which is directly incident on the sheet 45, but this may not lead to a conclusion that complete decoupling of the sheet from the frame is a general requirement for effective operation of the sensor devices 32 and 33. Given that the sheet 45 responds in the $d_{3h}$ mode, the predominant path for receiving seismic energy into the sensor devices 32 and 33 may be by stimulating a response primarily in the d33 mode, via direct coupling between the seismic wave front and the sheet 45, i.e., without the energy first passing through an intermediate material such as the frame 46. In the devices 32 and 33 the surface of the sheet 45 is relatively unconstrained, at least to an extent which enables it to substantially respond freely to an impinging wave. The responses differ from those of the PCSD because the surface of the sheet 45 may have greater mechanical coupling to the surface of the frame (e.g. the frame 46) from which seismic energy may propagate to the sensor element (e.g., the sheet 45). Further, the sheet 45 may also be applied directly or indirectly against the frame 46 under tension with the predominant means for stimulating the sheet with seismic energy nonetheless being through a path whereby the sheet 45 receives the seismic energy by direct coupling with the seismic-acoustic wavefield.

It may be advantageous that mechanical coupling between the sheet 45 and the frame 46 be minimized or eliminated by preventing direct contact of the sheet 45 with the frame 46. For the embodiment of the sensor device 32 shown in FIG. 3, this is readily effected by imposing an intermediate layer between the element and the frame, where the intermediate layer has relatively low stiffness and relatively poor transmission properties in the frequency range of interest. As one example, the intermediate layer may be an open cell or a closed cell foam material. Also to assure stability of the sheet 45, the sheet can be tensioned between spaced-apart frame portions.

The sensor devices 32 and 33 are strain rate sensors, providing an output signal in proportion to the strain rate experienced. The piezoelectric element of the devices, i.e., the sheet 45, creates a separation of charge when the material undergoes strain. That separation of charge is transformed into a suitable voltage via the interface circuitry 34 for further processing by the detection system 30. With the sensor devices 32 and 33 acting in the hydrostatic mode, i.e., $d_{3h}$, and with the sheet 45 constrained as little as possible (e.g., along a direction corresponding to a primary mode of response) to deform with impinging seismic energy, the sensing element 44 couples directly to the seismic-acoustic wave field to generate at least a portion of the signal response. The element 44 may have minimal interaction with damping or stiffening structures in order that the strain in the d33 mode experienced by the piezoelectric polymer on the molecular level provides a relatively large signal response (in effect, maximizing the $d_{3h}$ response) in the form of measurable charge separation. Bonding or wrapping the sheet 45 to the frame 46 with excessive tension may be detrimental to sensitivity of the sheet. The purpose of the frame 46 is not that of providing a barrier or constraint to a particular mode (e.g., $d_{32}$) or to enhance another mode, e.g., $d_{33}$, but, rather, to provide integrity to the sensing element 44 and electronic components which may be integrated within the sensing devices 32 and 33.

Further, the sensor devices 32 and 33 are designed as point receivers in the frequency range of interest, e.g., 2 to 1000 Hz, having a substantially omni-directional response. With the element 44 designed as a point sensor, cancellation effects are avoided among components of signal acquired over the effective area of the sheet 45. The sensor element 44 behaves as a point sensor when it extends over a limited distance consistent with the wavelength being sensed. Consequently, when a seismic wave impinges on the element 44, charge separation of the same sign is generated in all sections of the sheet such that the signal components generated in different subregions of the sheet 45 are additive.

With the sensor device 32 a single sensor element 44 can be used to capture strains in all directions and the sensor device 32 can be placed in field locations for data acquisition without regard to its orientation. Further, in the context of signal acquisition from seismic-acoustic wave fields, the sheet 45 may have a substantially flat frequency response ranging at least from 1 Hz to above one KHz. The observable frequency response may, however, be limited by characteristics of other components in the detection system 30, such as the interface circuitry 34 and sampling frequencies of the analog-to-digital circuitry 36.

Numerous alternate embodiments of sensor devices according to the invention comprise one or more sheets 45 comprising piezoelectric material attached to a frame with the sheet 45 constrained as little as possible in order to be responsive in one or multiple modes. The sheet 45 couples directly to the seismic-acoustic wave field to generate at least a portion of the signal response and deforms with seismic energy impinging directly on the sheet 45. The sheet 45 may have minimal interaction with damping or stiffening structures in order that the strain experienced by the piezoelectric polymer provides a relatively large charge separation. By way of example, the sheet 45 may, in principle, be suspended or stretched between one or more pairs of frame members so that the position of the sheet 45 is stabilized while the surface 45a of the sheet against which the seismic-acoustic wave field impinges is relatively unconstrained, or constrained as little as possible, in order to generate at least a satisfactory or, preferably, an optimum level of charge separation. It is to be understood, however, that a sensor device so constructed may require packaging and isolation treatments which permit relatively unconstrained movement of the sheet 45 while enabling the sheet to tolerate environmental conditions associated with field deployment, e.g., underground placement, and which may demand a rugged and durable attachment of the element 44 to a structure which incidentally results in some mechanical coupling between the piezo sheet 45 and the structure.

Having described numerous exemplary embodiments of the sensor device 32 or 33, it should also be understood that the frame is not limited to the disclosed geometries. The frame 46 may be in any of a variety of shapes including multi-sided solids and structures having conical or elliptical shapes in cross section, and may be flat surfaces or shapes that extend along flat planes.

The system 30 incorporates the sensor device 32 or 33 to detect and classify SOI's. The detection system 30 may be a sealed unit which can be buried at an arbitrary depth beneath the surface of the ground, but numerous other placements may be had, including deployment on a ground surface, above the ground, over water, in water or in water-saturated earth.

The sensor device 32 or 33 passively monitors the seismic-acoustic energy at its location. When a signal of potential interest is observed, the system 30 automatically processes and analyzes the signal. If the detection system 30 determines that one or more threshold criteria are met for one or more specific classifications, it communicates the Determination 20 regarding classification of the SOI to a remote receiver 42. For embodiments where the receiver is a base station, the received information is converted into one or a plurality of user notifications. These could include a simple audio or visual alert, the cueing of a camera, an unmanned aerial vehicle or other imaging or sensor system, the activation of a geophysical information system display showing location (known as putting "dots on a map"), or any other action required by a user.

In one series of embodiments, the tubular shape of the sensor device 32 enables integration of all electronics needed to perform signal processing, including Analyses 18 which lead to classifications and issuance of Determinations 20, within the frame 46 of the sensor device 32. However, the packaging of such a system is not limited to integrating the associated electronics within the frame or to any particular shape or configuration or requirement that the electronics be positioned within or adjacent the sensor device. A feature of placing the electronics within or adjacent the sensor device 32 is the ability to perform all requisite analyses at the location of placement so that data transmitted to the remote receiver can be limited to the Determinations 20.

Similar functionality may be had when the integrated electronics is positioned near or remote from the sensor device 32 by providing a hardware platform on which the signal processing and communications occurs. Other embodiments are discussed herein with reference to FIGS. 12 and 13. Embedded software may operate within a single electronics platform which provides signal processing, communications support, and intercommunication within the internal assemblies. When the signal acquisition, processing and communications electronics is all placed within the frame 46, the frame serves as a mechanical housing which provides structural support for the internal assemblies, protection from the environment, and a mounting point for the sensor device 32.

To serve as an effective point receiver over the frequency range of interest, the frame 46 about which the sensor device 32 is wrapped is of limited size. This is consistent with the teachings in the '796 patent which, for example, suggests a cylindrical frame size approximately 3 inches (7.6 cm) in diameter and 12 inches (30.5 cm) in height. This size may be advantageous when using a piezoelectric cable as a sensor element because it provides sufficient capacity to spiral wrap at least 6 meters of cable about the frame. With such length it is possible to achieve a SNR of 15 dB at a sensed frequency of 125 Hz (a typical frequency for sensor applications) and classify SOI's at relatively large distances from the sensor device (e.g., footsteps at 55 m in a test directly comparing piezoelectric cable sensors with sensor device 32.)

With the sensor device 32 formed with a sensing element 44 or 44', comprising a rectangular sheet 46 having a length of 6.72 in. (17 cm) and a width of 0.86 in. (2.2 cm), the cylindrical shaped frame of FIG. 3A on which the sheet is placed is approximately 2.0 inches (5.1 cm) in diameter and 2 inches (5.1 cm) in height. With the sensing element 44', the device 32 provides a SNR of about 23 dB at a frequency of 125 Hz, enabling classification of SOI's at greater distances from the sensor device (e.g., footsteps at 105 m in a test directly comparing piezoelectric cable sensors with sensor device 32.)

FIG. 4 is a partial exploded view of the sensor device 32 illustrating components in spaced-apart relation. The frame 46 shown in FIG. 3A is generally in the form of a tubular body having a pair of first and second opposing end caps. For the illustrated embodiment, the frame 46 comprises a cylindrically shaped wall 52 extending between upper and lower wall ends 52U and 52L and surrounding the chamber 100. The interior of the frame is enclosed with upper and lower end caps 50U and 50L. The lower end cap 50L is integrally formed with the wall 52, such as through a plastic injection mold process. The upper end cap 50U is attachable to fit over the upper wall end 52U (e.g., with a flange that extends within the cylindrically shaped wall 52 to facilitate a secure fit.

With the wall 52 having a circumference of about 6.3 inches (16 cm), the length of the foam layer 47 extends circumferentially about the cylindrically shaped wall 52 a distance of about 6.3 inches. The width of the foam layer 47, about one inch (2.54 cm), extends between the end caps 50L, 50U (along an exemplary vertical direction). The thickness of the foam layer 47 is 3/32 in (0.24 cm). The foam layer 47 is positioned against the wall 52 as shown in FIG. 3A with an adhesive bond. The width of the foam layer 47 could be greater than one inch so that it extends vertically to each of the end caps 50L, 50U, but in the illustrated embodiment each in a pair of foam layer strips 54a are positioned vertically above or below the foam layer 47. The strips 54a extend circumferentially, completely or nearly completely about the wall, e.g., 6.3 inches (16 cm). The foam layer strips 54a each have a thickness equivalent to that of the foam layer 47, e.g., 3/32 in (0.24 cm), and a width, extending vertically above or below the layer 47, of about 1/4 in (0.635 cm) The foam layer 47 and the strips 54a are attached to the wall 52 with an adhesive. The material of the foam layer 47 and the foam layer strips 54a has a density of 0.46-0.77 g/cm³. A suitable product is sold as "Extreme Temperature Silicone Foam by the McMaster-Carr Supply Company.

The upper and lower endcaps 50U, 50L and the wall 52 may be formed from a variety of materials, including metals and plastics, conventional injection mold plastics and polyvinyl chloride (PVC). In other embodiments the wall may be composed of Polyethylene Terephthalate Glycol with a wall thickness of 0.32 inch (0.81 cm) and an outside diameter of 3.135 inch (7.96 cm) as discussed for a frame described in the '796 patent.

The sensor device 32 includes electronics to perform the signal conditioning 14 and optional digital conversion. An electronics board 56 is positioned within the frame 46 adjacent the upper end cap 50U. The board contains analog interface circuitry 34 that provides a voltage signal proportional to charge separation occurring in the piezoelectric sheet 45. The board 56 may also include digital analog-to-digital circuitry 36 to provide an input to a data processing assembly 38. A connector 58 extends from contacts on the board 56 and through a port 59 in the upper end cap 50U to provide signal data from the sensor device 32 to the data processing assembly 38.

One or both of the end caps 50U, 50L may be removeably attached to the wall 52. As shown for the upper end cap 50U, a removable end cap may have a "T" cap configuration about the periphery so the underside 50US protrudes into and along the inner surface 52S of the cylindrical shaped wall 52. With this arrangement, the underside 50US of the upper end cap 50U serves as a support platform to which a board on which the circuitry 34, 36 is mounted, e.g., with a bonding cement. The outer surface 50OS of the cap 50U is suitable for mounting of a handle, connectors, an indicator light or a vent thereon. The upper end cap 50U is bonded to the wall 52 by, for example, applying a bonding cement along the end cap periphery on the underside 50US, e.g., on the surfaces defined by the "T" cap configuration. The resulting joint between the wall 52 and the end cap 50U may be further sealed with application of hot melt strips. In other embodiments hermetic sealing of joints between end caps and frames 46 can be effected with recesses (e.g., as defined with the "T" cap configuration) into which O-rings are placed. The frame 46, including the pair of end caps 50U, 50L bonded to the wall 52 constitutes a closed body assembly that further defines the chamber 100 which houses the electronics for the circuitry 36, 56a.

The sensing element 44' includes a set of leads 57, including a pair of output leads connected to the upper and lower electrodes 44b, 44c and a shielding lead connected to the shield conductor 44d. See FIG. 3D. The sheet 45' is mounted to the surface 62 of the foam layer 47 which faces away from the frame 46 and the leads 57 extend through a port 64 which provides access through both the foam layer 47 and the frame wall 52 to carry signal received in the sheet 45' to the interior of the frame 46 as an input to the analog interface circuitry 34 on the electronics board 56. As noted below, the sheet 45 is attached under tension. The attachment may be effected with a two sided adhesive tape positioned between the foam layer surface 62 and the insulative coating 48 on one side of the sheet 45.

The sensor device 32 may include external fittings on the frame 46 as described in the '796 patent, including connection elements for power and communications (wired or wireless), a pull handle, a purge valve, a power-on indicator, and a tether connector.

FIG. 5 provides an external view of the sensor device 32. A cladding jacket 88 provides an opaque hermetic sealant 88 to protect the sensor device from damage due to the environment, including placement underground or in a harsh environment. The jacket may, for example, be a two-part epoxy resin or a durable silicone rubber, applied over the sheet 45, the foam layer strips 54a and other exposed surfaces.

As the piezoelectric polymer within the sheet 45 responds to excitations induced by seismic-acoustic waves, it is desirable that the polymer material freely undergo displacement in all directions, i.e., in the $d_{3h}$ mode. As described in the '796 patent, when the sensor element of a seismic-acoustic Piezoelectric Cable Sensor Device (PCSD) is wrapped about a frame, it is desirable that the cable not be tightly wrapped about the frame. The responsiveness of that sensor element to direct incidence of a seismic-acoustic wavefield can be adversely affected by contact between the sensor element and the frame. Contact between the sensor material and the frame can constrain the sensor material to primarily respond with the frame. To enhance the response of the piezoelectric material to direct incidence of the wavefield, it is therefore important to minimize or eliminate the mechanical coupling between the piezoelectric cable and the frame or the foam layer 47 about which the cable is wrapped. Otherwise, substantial contact between the materials can limit the ability of the sensor material to freely respond to the wavefield incident thereon. Specifically, the contact may have a dampening effect which limits the amplitude of the signal developed in response to the wavefield energy.

Disclosure in the '796 patent, however, does not address how other factors might influence the responsiveness of a piezoelectric material, or the signal to noise ratio of the response generated by the sensor. Additional properties have been observed which enable generalization of how certain variables can influence sensor performance. For example, multiple configurations of piezoelectric sensor devices, including the design illustrated in FIG. 3A, could provide higher signal to noise ratios or greater sensitivities by placing the piezoelectric material under tension.

For a given surface area of piezoelectric material, in device designs for which direct coupling is the predominant means of response, there can be a higher level of sensitivity when the piezoelectric material is tensioned. For both the PCSD and the device 32, a higher level of sensitivity can be achieved when the cable or the sheet 45 is tensioned. The improved sensitivity enables detection of signals of lower energy than previously achievable while sustaining a satisfactory level of mechanical decoupling from the frame. Advantageous embodiments provide a balance between a more optimal level of tension under which the piezoelectric material is placed and the degree of coupling between the piezoelectric material and any surface against which the piezoelectric material is placed.

A suitable balance results in (i) such limited coupling between the tensioned sensor element and the frame as to still render direct coupling of the sensor element with the wavefield the predominant means for stimulating the sensor element with seismic energy; and (ii) a level of tension, under which the piezoelectric material is placed, sufficient to maximize the responsiveness of the piezoelectric material to direct impingement of the wave field. In some instances, by increasing the tension along a circumferential direction about a frame along which the piezoelectric material is supported, the amplitude of the signal generated by the piezoelectric material can triple. For the device 32 of FIG. 3A, with the piezoelectric sheet 45 positioned along the exterior surface 46a of the frame 46, and a layer 47 of closed-cell foam positioned between the surface 46a and the sheet 45: the sensor element 44 or 44' is tensioned to an extent which displaces one end of the element 0.70 percent farther about the circumference of the frame 46. It is to be understood that such displacement of one or both ends about the circumference by tensioning may not be primarily due to stretching of the sheet but may be attributable in part to deformation and compression of the closed cell foam layer 47.

Figure 16:
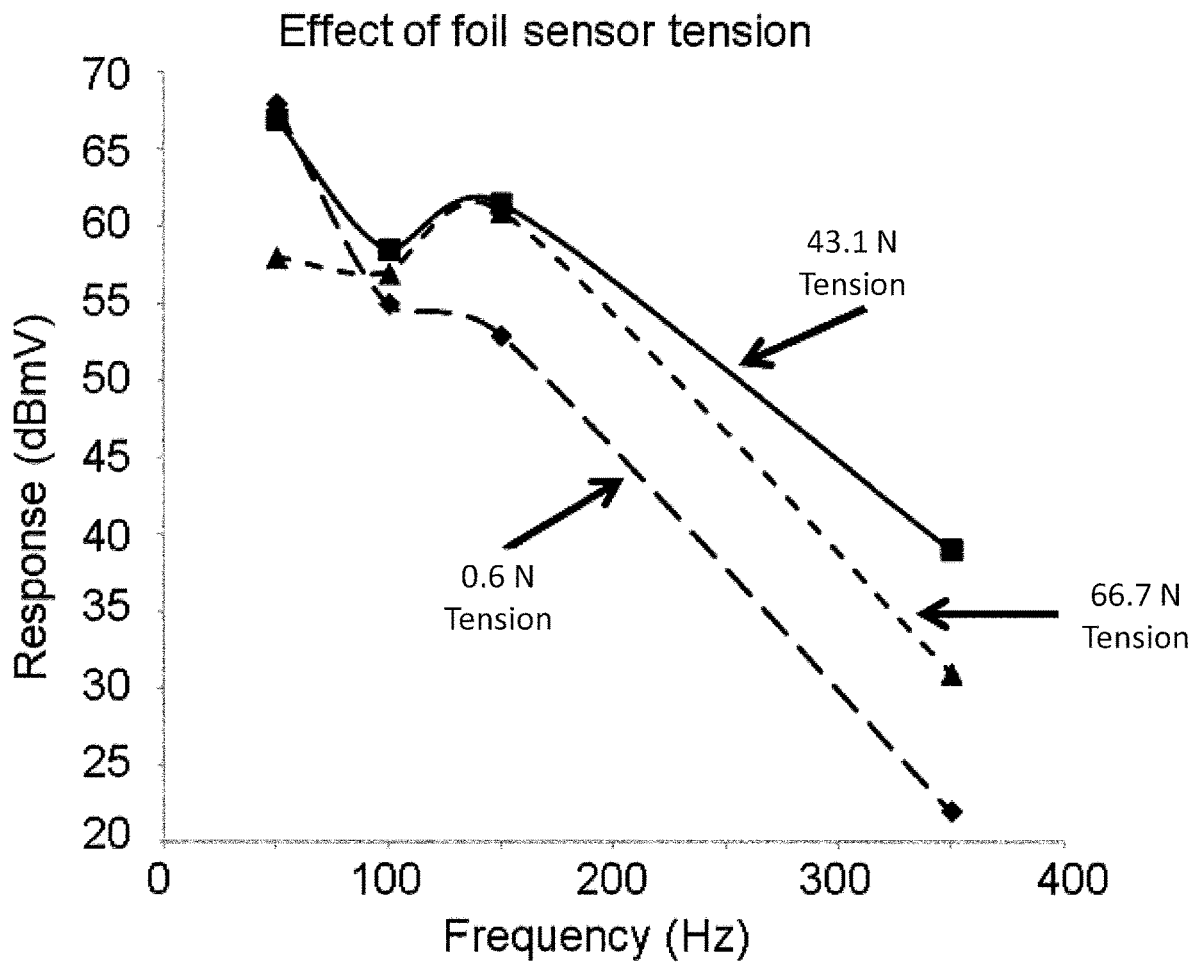
FIG. 16 illustrates improvements in signal response of a piezoelectric element resulting from tensioning according to another embodiment of the invention.

Improvements in signal response due to the tensioning effect are shown in FIG. 16. The frequency response of the sensor device 32 is shown under the conditions of very low tension (0.6 N); medium tension (43.1 N); and high tension (66.7 N) applied to the foil sensing element 44' when being mounted to the foam layer over the mandrel. The responsivenss of the sensor 32 was measured from 50 Hz to 350 Hz, a frequency range of principal interest for numerous the sensor applications. With very little tension (~0.1 lb), there is good low frequency response, but minimal response at high frequencies. At high tension levels (~15 lb), the high frequency response improves, but performance is degraded at low frequencies. At an intermediate tension (~9.7 lb), the responsiveness is highest at all frequencies.

A feature of embodiments of the invention which incorporate tensioning is that it becomes possible to calibrate the sensitivity of multiple sensors and it is possible to adjust the tension of individual sensor elements in an array to match the response of all sensor elements in the array for the purpose of coherent signal processing. Further, it has been determined that the functional relationship between an increase in sensor element response and an increase in tension has a positive slope which decreases as the tension increases. Accordingly, by adjusting the tension of each, the signal responses of multiple sensor elements can converge to very similar or identical characteristics.

The above-noted features of inventive embodiments are based on tensioning the piezoelectric material during assembly of the sensor device (e.g., device 32 or 33), also referred to as post tensioning. Tensioning of the piezoelectric material during assembly of the sensor device 32 or 33 is a separate and distinct tensioning in addition to any intrinsic level of tension created during or resulting from manufacture of the piezoelectric material (e.g., the foil layers 44 and 44'). It has been found that, by placing the piezoelectric material under the additional tension, charge separation in response to incident wave energy and the signal to noise ratio both increase.

Tension applied to the sensor element 44 of the device 32 results in application of pressure against the foam layer 47. Although the '796 patent proposes use of such a foam layer as a decoupling element, sufficient steady state stress can compress the decoupling element, thereby increasing mechanical coupling of the sensor element to the frame 46 about which it is attached. Nonetheless, in a low frequency regime (e.g., up to one kHz), where approximations based on continuum mechanics are valid, such low driving frequencies imply relatively low strain rates that there is sufficient decoupling of the sensor element from the frame to allow direct coupling of the sensor element with the wavefield to be the predominant means for stimulating the sensor element with seismic energy. That is, frequency dependent behavior of the decoupling element, under relatively small (e.g., infinitesimal) strains, is in line with the behavior of an elastomer. In response to direct incidence of the wavefield on the sensor element, the sensor element undergoes wave deformations without the response being constrained significantly by the frame 46.

In contrast to this, in the same frequency range, when the tension is in the regime where slope decreases (i.e., the incremental increase in sensor response diminishes as the tension increases), such higher tensioning of the sensor element should still result in higher compression of the decoupling element. Under high strains and strain rates resulting from the wavefront having higher power, the material of the decoupling element may act mechanically more like an elastic solid or "glass" than an elastomer (in which case the sensor element could be considered "coupled" to the electronics container.

Figure 6:
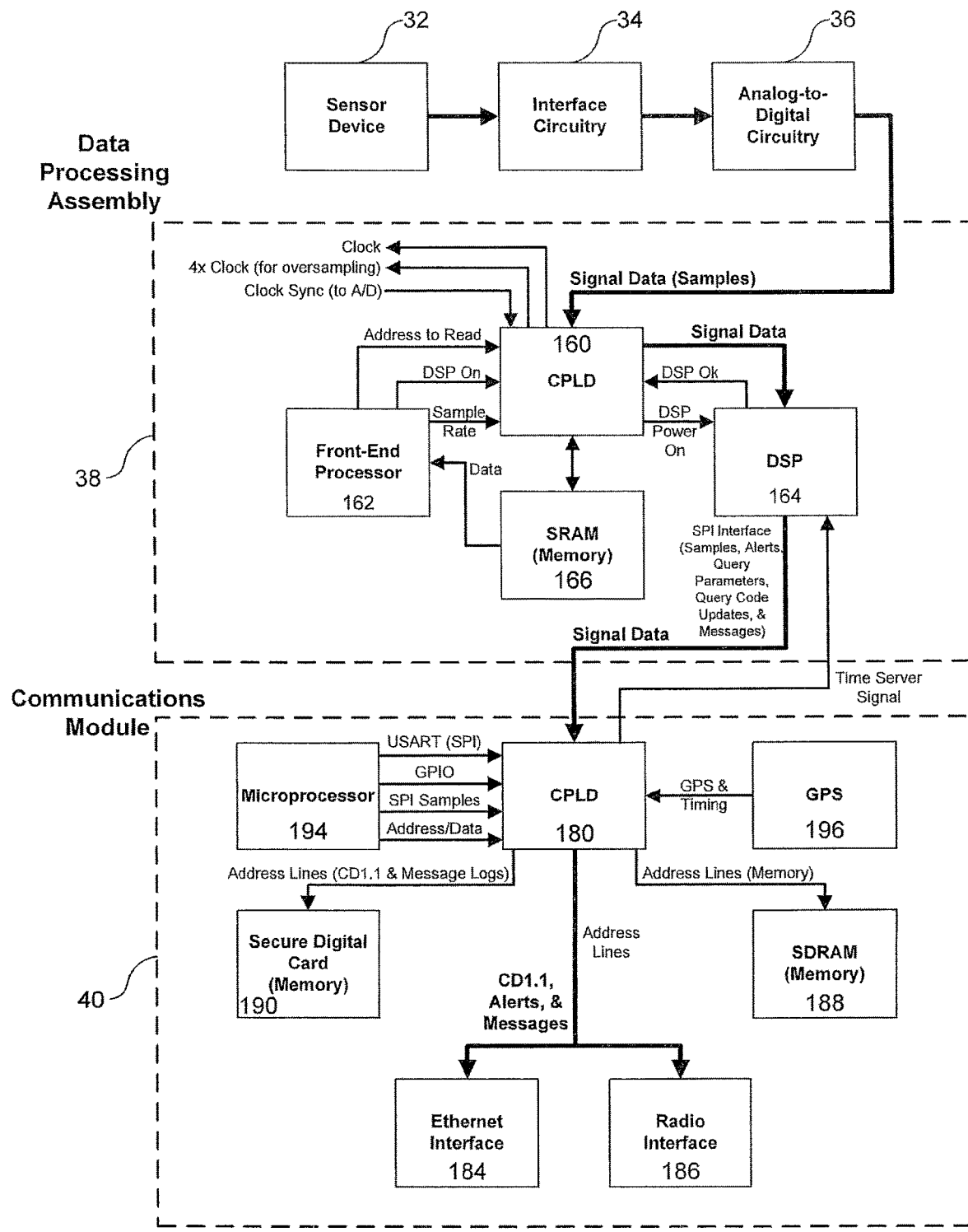
FIG. 6 is a simplified schematic diagram illustrating a general architecture of integrated electronics of the detection system.
Figure 7:
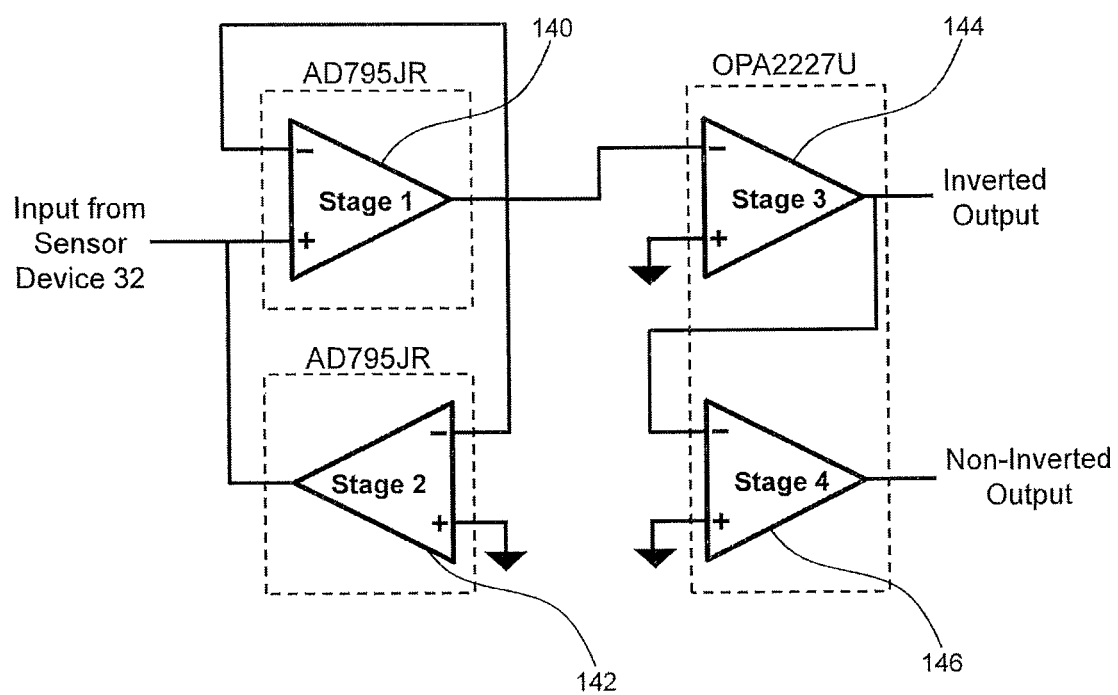
FIG. 7 is a simplified schematic diagram of analog interface circuitry shown in the architecture illustrated in FIG. 6.

FIG. 6 illustrates the electronics chain which processes seismic and acoustic data acquired by the sensor device 32. The data is received by analog interface circuitry 34 for conditioning and amplification to provide an analog voltage signal to A/D circuitry 36. See FIG. 7 which illustrates an embodiment of the interface circuitry 34 in a simplified form comprising four analog stages contained within three physical operational amplifier integrated circuits (op amps).

The first stage 140 (Stage 1) and the second stage 142 (Stage 2), which receive the low voltage input from the sensor device, are low-noise, precision, Field Effect Transistor (FET) op amps. The third stage 144 (Stage 3) and the fourth stage 146 (Stage 4) reside in a single low-noise, high-precision op amp. The first stage 140 conditions the sensor device output with a high-gain amplifier and feeds the second stage 142 for control feedback and the third stage 144 for output generation. The first stage 140 also provides a control feedback connection with a pair of capacitors set to match the capacitance of the sensor element 44. Typically, piezoelectric films larger in area require larger capacitor values and piezoelectric films smaller in area require smaller capacitor values. The second stage 142 functions as a "servo amplifier" and ensures that the sensor element input on stage 140 is zeroed. This integrated feedback loop maintains signal integrity by actively controlling the signal input to the first stage 140.

The third stage 144 and the fourth stage 146 serve as output drivers with unity gain. The gain of these stages could be increased but doing such may require board level component changes. The third stage 144 provides an inverted signal output and the fourth stage 146 provides a non-inverted signal output. The non-inverted output is input to the A/D circuitry 36, and the inverted output is provided to a test point on the assembly.

The A/D circuitry 36 provides a 24-bit analog to digital signal conversion with anti-aliasing and four-times (4×) oversampling. The Data Processing Assembly 38 processes and analyzes signal data received from the A/D circuitry 36. The results of the analysis are provided to the Communications Module 40 for external notifications and data transmission. The Data Processing Assembly 38 comprises a first Complex Programmable Logic Device (CPLD) 160, a front-end processor 162, a Digital Signal Processor (DSP) 164 and a dual port Static Random Access Memory (SRAM) 166.

The CPLD 160 governs the interaction of the front-end processor 162 and the DSP 164 and data transfers between SRAM 166 and the processors. The CPLD also transmits clock signals originating on the DSP 164 to the A/D circuitry 36 and components on of the Assembly 38. The A/D sampling rate is defined by the front-end processor 162 and the CPLD 160 turns this into a clock signal which is fed at a normal and 4× (oversampling) rate to the A/D circuitry. The CPLD 160 also simulates hardware functions via embedded software using, for example, the VHDL programming language.

The A/D circuitry 36 provides a serial feed of data to the CPLD 160. The data stream from the circuitry 36 begins with a unique set of bits to signal an incoming sample, followed by 24 bits of sampled data, followed by trailing set of bits to signal the completion of the data.

Data received by the CPLD 160 is stored in the SRAM using a circular buffer and is accessible to both the front-end processor 162 and the DSP 164 via the CPLD 160. This memory area can retain up to 50 seconds of historical data to assist in the signal analysis process as needed. The CPLD 160 communicates with the DSP via a Serial Port interface.

The Front End Processor 162 provides basic monitoring of signals while the DSP 164 is idle to minimize power consumption. The DSP 164 performs advanced analysis, detection and classification of signals. The Front End Processor 162 runs Finite Impulse Response (FIR) filters for sample analysis. After applying the filters, the front-end processor performs a gross-level pre-analysis on all samples received to determine whether a signal of potential interest is present, in which case the DSP goes into a processing mode. This methodology minimizes the DSP's "on-time" and reduces current usage to extend the battery life of the sensor.

When a signal is detected as data of potential interest, the front-end processor 162 directs the CPLD 160 to activate the DSP 164 and the CPLD 160 issues signals that turn on power to the DSP. In response, the DSP returns a signal to the CPLD indicating it is ready. The front-end processor 162 provides the memory address (pointer) to be read to the CPLD 160 and then the samples are fed to the DSP 164 for analysis. When the DSP 164 finishes processing the samples, it signals the CPLD to remove the front-end processor 162 from an idle mode and resume processing of information. The front-end processor 162 re-starts at a historical memory location (approximately five seconds in the past) to ensure that no samples are missed—ensuring continuous operation. Once the front-end processor 162 re-starts data analysis, it requests the CPLD 160 to deactivate the DSP in order to conserve power. An exemplary form of the DSP 164 suitable for running signal analysis algorithms for classifications and Detections 20 is a fixed point, dual core, 500 MHz, 32-bit processor and. The DSP consists of two processors (Core A and Core B), which operate independently but have access to certain common memory resources.

When powered up by the CPLD 160 the DSP receives historical information starting at the identified memory pointer. Initially the rate of data transfer is very fast, using the maximum SPORT interface speed, but once the DSP completes processing of the historical data and begins processing signal data on a real time basis, the transfer rate is reduced to 2,000 samples per second. The transfer rate may be increased to 10,000 samples per second. The DSP uses the classification algorithms to detect and classify signals of interest. Upon identification of a classified SOI meeting confidence level criteria, the DSP signals the communication module 40 for external notification of a Detection 20.

Each core has assigned responsibilities which are summarized herein. L1 cache memory is provided for each core. The total memory for L1 is 100 k of which 32 k is allocated for instruction space, 4 k for short term (scratch) use, and 64 k for data. L2 memory is dual-ported and accessible to both cores, providing space for samples and logging information. A mutual exclusion lock is implemented in the hardware to facilitate core access to L2 memory. L3 memory is external to the DSP and resides on a separate SRAM chip on the processing board.

Core A of the DSP 164 initializes the operating environment for the DSP embedded software structure, handles handshaking with embedded software running on the front-end processor 162 and embedded software running on Core B of the DSP, as well as operational management of DSP Core B, communication to the Communications Module 40 and messaging relating to alerts and warnings.

Core A of the DSP 164 receives frames of data and loads them into L2 memory, using a circular queuing method. The queue may be configured to support 10 seconds of data. Core B retrieves the frames of data and performs the requisite analyses, detection, classification and Determinations 20 using the developed algorithms. Upon completion, Core B indicates whether a SOI has been identified in accord with a predetermined level of confidence and transfers this and associated information to Core A via a logging mechanism. If a SOI has been identified which meets confidence level criteria, Core A facilitates the information transmission of the Determination 20 via the Communications Module 20. After the processing is completed, the DSP requests deactivation to revert to a power savings mode. Core B of the DSP 164 initializes support structures, reads signal samples, and runs the classification algorithms for the specified classification types, generating warnings and alerts as necessary.

The Communications Module 40 can receive the sampled data stream, alerts and warnings generated by the DSP 164 and other messages specific to the operation of the Data Processing Assembly 38. All data flows from the DSP 164 of the Assembly 38 to a second Complex Programmable Logic Device 180 which controls flow of information to local memory and for transmittal via, for example, an Ethernet Interface 184 or a Radio Interface 186. The Module 40 includes program and data memory 188 supporting functions of microprocessor 194 and storage, shown in the form of a secure memory card 190, for storing signal data. Signal data may be uploaded via an interface 184 or 186 for transfer to a base station for further analyses or use in conjunction with training of classifier algorithms. The microprocessor 194 provides control functions for transmission through the Ethernet Interface and also applies algorithms to compress signal data prior to transmission through the interfaces 184 or 188. In addition, the microprocessor manages radio transmission through the interface 186 to minimize power consumption, manages Ethernet communications and provides a web-enabled interface for configuration parameter control and adjustment. A Global Positioning System (GPS) receiver 196 provides timing data which is sent to the Data Processing Assembly 38 through the CPLD 180. The timing signal received from the GPS controls the clock signals used by the Front End Processor 162 and the DSP 164 and is used to assign time information to frames of signal data.

Figure 8:
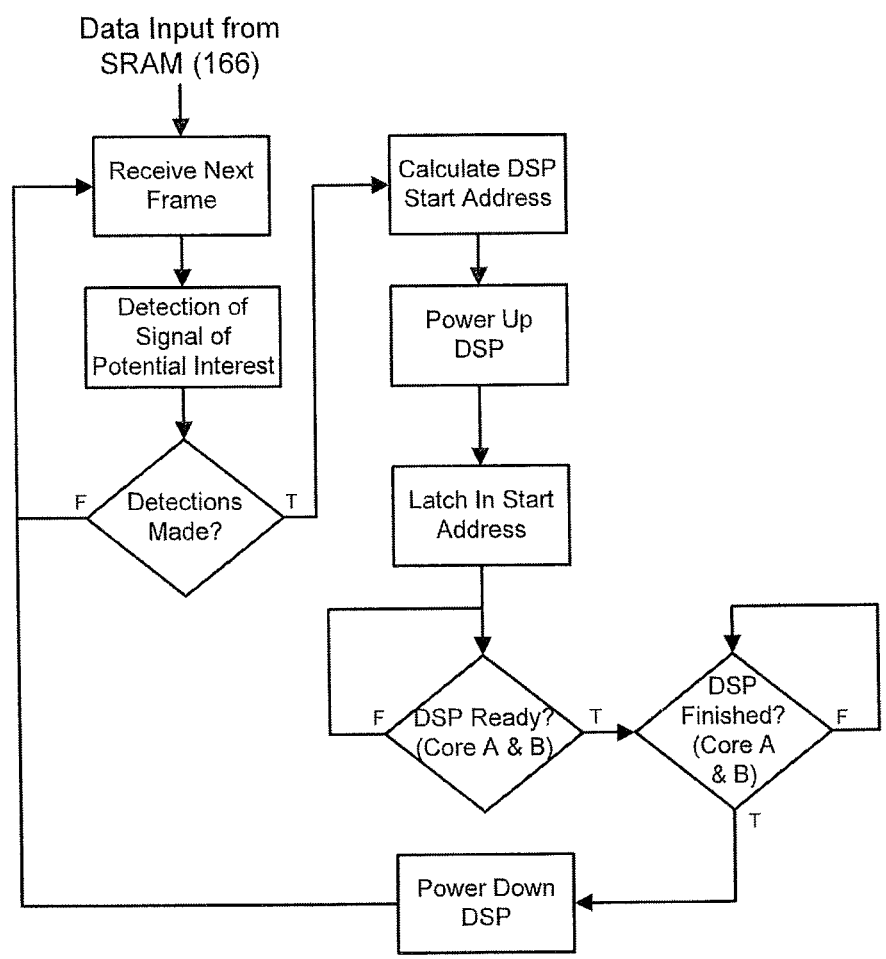
FIG. 8 is a flow chart illustrating a sequence by which signals of potential interest are identified.

The flow chart of FIG. 8 illustrates the main process loop by which signals of potential interest are identified, after which time single cycle and multi-cycle processes are applied to determine whether signals can be classified as SOI's. There is a continual flow of signal data into the CPLD 160 which is cyclically stored in SRAM 166. The Front End Processor 162 defines the data length of frames and acquires signal data from the SRAM 166 and then executes an algorithm for Detection of Signals of Potential Interest. When a Detection is made the Processor 162 performs tasks for hand-off of processing to the DSP 164, beginning with identification of memory address information in order for the DSP to begin reading signal data from SRAM 166. The Processor 162 also sends a signal through the CPLD 160 to turn on the DSP 164. While the DSP is powering up, the address at which signal data is to be read from memory is sent to the CPLD 160. Once the DSP 164 is ready the Processor 162 goes into an idle state while the DSP performs analyses relating to single cycle classification, multi-cycle classification and Determinations 20. Once the DSP is finished the Front End Processor 162 resumes Detection of Signals of Potential Interest.

Figure 9:
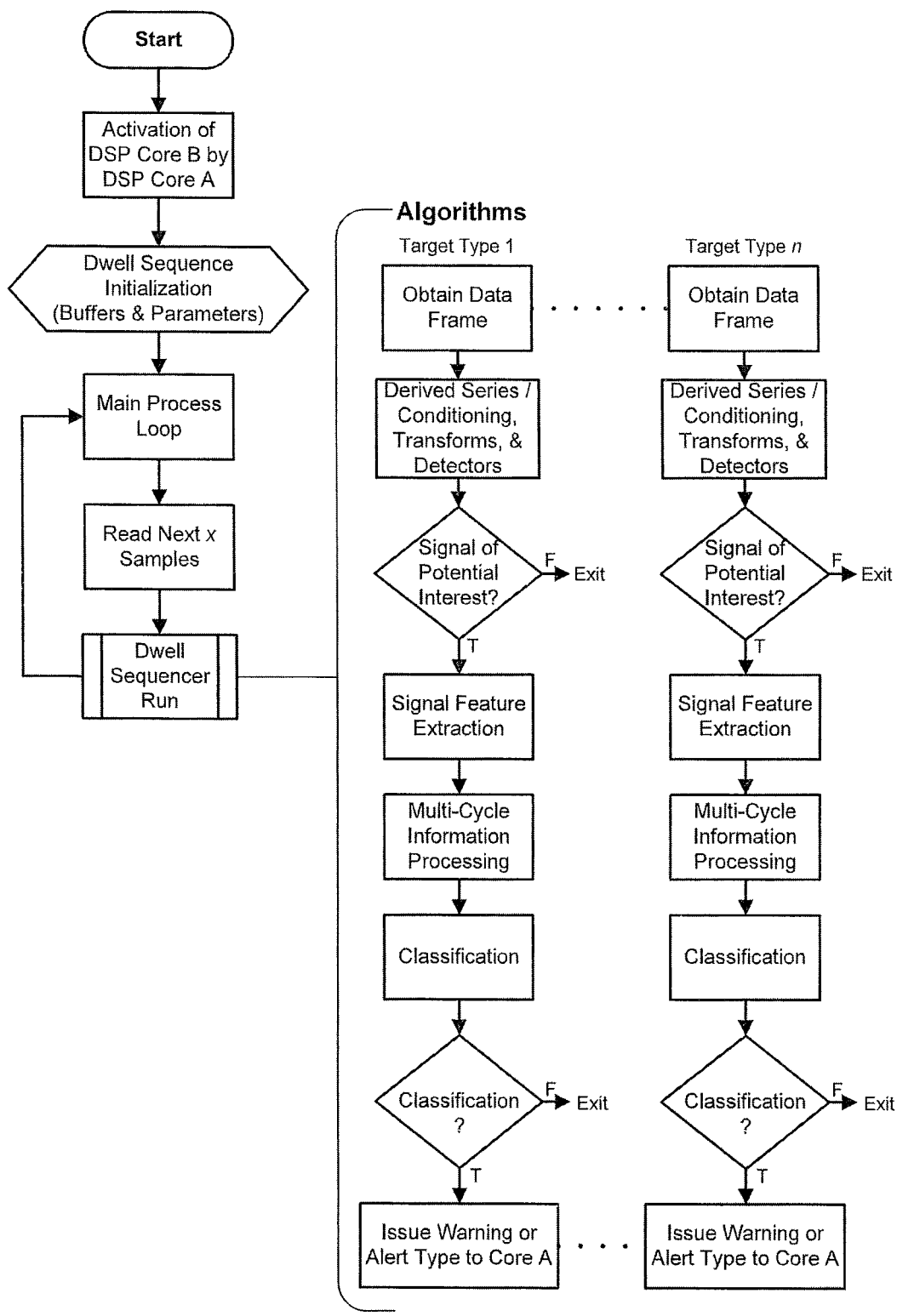
FIG. 9 is a flow chart illustrating a sequence by which analyses leading to classifications and determinations of Signals of Interest are performed.

FIG. 9 provides a general sequence of steps by which the DSP 164 performs analyses relating to classification and Determinations 20. Once the CPLD turns on the DSP, Core A of the DSP initializes DSP Core B and related storage. DSP core A sends a signal to the Front End Processor 162 to confirm that the DSP is operational and enables Core B for algorithm processing, starting with a main loop. Signal data is received from the SRAM 166 through the CPLD 160 and the samples are buffered for input to the Algorithms. The Main Loop also runs the Dwell Sequencer which pipes data through each of the Algorithm sets to identify SOI's corresponding to any of Target Type 1 through Target Type n. Algorithms are created specific to target type, but all Algorithms follow a basic series of operations as shown in FIG. 9. It is to be understood that the descriptions of the Algorithms are conceptual and functional and do not necessarily depict the sequence in which individual steps are executed.

Each Algorithm begins with obtaining individual frames of data, next conditioning the data, computing transforms and applying detection criteria. If a Signal of Potential Interest is not detected the DSP hands Signal Detection back to the Front End Processor 162 and is powered down per FIG. 8. If a Signal of Potential Interest is detected the DSP proceeds with Signal Feature Extraction wherein the characteristic features of the detected signal are consolidated in a single cycle detection object and a multi-cycle detection object as more fully described hereafter. As the Algorithm processes through frames of signal data the accumulated information is buffered. When sufficient data is acquired there is either a classification or a determination that there is not a SOI. If there is a classification a Warning or an Alert is sent to Core A for issuance.

Although depicted as separate flows for each Target, the execution of steps of different Algorithms may be interleaved. For example, Core B may perform conditioning, obtain transforms and perform detections for multiple Algorithms before proceeding to Feature Extraction and Classification.

Figure 10:
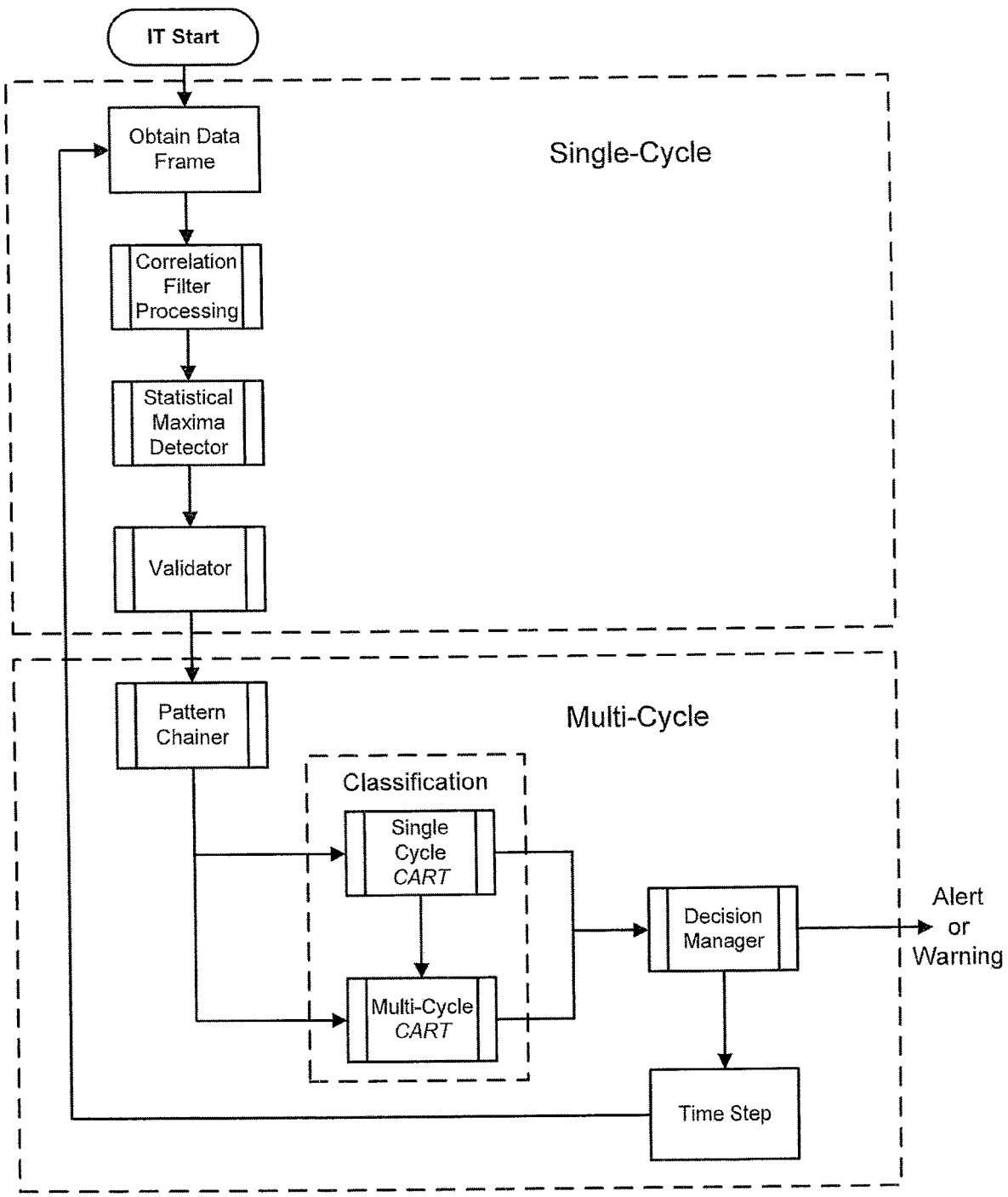
FIG. 10 is a flow chart illustrating an exemplary classification process.

FIG. 10 is exemplary of one implementation of a classification process for an Impulsive Transient (IT) signal. Individual frames of data are read and the algorithm applies one or more correlation filters and a statistical maxima filter which examines results of the correlation filter for maxima. A Validator examines derived series representing noise, correlation minima and other statistical quantities to determine whether detections are valid and build single cycle detection objects. Single cycle detection objects are then made available for multi-cycle processing. The initial step is the formation of multi-cycle detection objects with a Pattern Chaining Algorithm which uses the information contained in the single cycle detection objects and expert logic to associate suitable detection objects and extract additional information. The multi-cycle detection objects are then examined by the IT classification algorithms (Single Cycle Classification and Regression Tree (CART), Multi-Cycle Classification and Regression Tree (CART) and if a classification is made the result goes to the Decision Manager to determine whether to issue a Warning (based on single cycle assessment) or an Alert (based on multi-cycle assessment).

Figure 11:
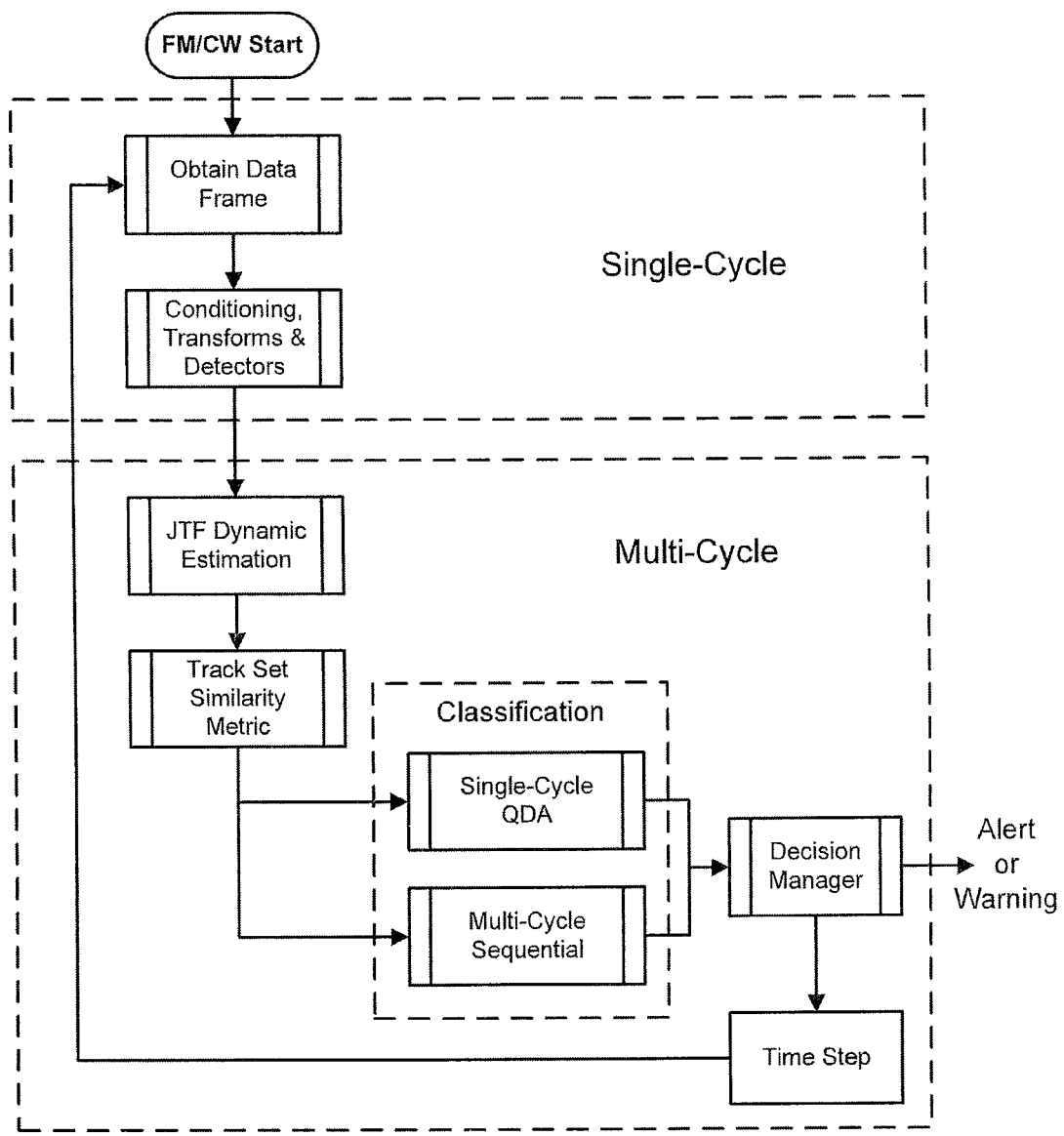
FIG. 11 is a flow chart illustrating another exemplary classification process.

FIG. 11 is exemplary of one implementation of a classification process for an FM/CW signal. The algorithm performs conditioning, transformations and detections to individual frames of data. Detection is based on statistical quantities derived from current spectral power levels in defined frequency channels relative to previous estimates of noise levels. Single cycle detection objects are created from this information and made available for multi-cycle processing. Multi-cycle processing is initiated using a state-based estimation routine in the Joint Time Frequency (JTF) Domain, incorporating time-frequency track information and dynamic models of how that information evolves in time. The Track Set Similarity Metric is a determination based on associations among the total set of tracks and based on characteristics of specific sources. Each of the tracks is a multi-cycle detection object used in the classification stage which comprises a single cycle Quadratic Discrimination Analysis (QDA) and Multi-cycle Sequential Analysis. When a signal is classified as an FM/CW SOI the Decision Manager issues a Warning or an Alert based on confidence level thresholds set in the configuration for the Decision Manager.

The goal of many passive monitoring systems for situational awareness or local area monitoring is to detect and classify signals generated by a source or activity that requires a response. These signals are considered rare events embedded in a variable background of noise and finite duration signals that are not of interest. The monitoring system may be comprised of a single sensor device or a group of sensor devices that output a signal that may be converted into a continuously sampled digital time-series. The time series is further processed with the objectives of identifying and separating the Signals of Interest from the bulk of the noise and uninteresting signals present in the data stream and then classifying the signals.

In the detection system 30 a sensor device 32 measures the ambient strain field for seismic or acoustic energy in the form of a traveling elastic strain field generated by a specific source or activity. The measurement, processed as a time varying voltage, which is proportional to the strain rate, is sampled and converted into a digital time series. The Signal of Interest may be one of several broad classes of signals. Those classes may include very short time duration transient phenomena referred to as Impulsive Transient (IT) signals, narrow-band continuous phenomena of longer duration whose character is best expressed as a frequency domain phenomena and referred to as Frequency Modulated Continuous Waveform (FMCW) signals, or Emergent Signals (ES), mixtures a transient FMCW phenomena that may emerge from and recombine with the noise background compared relatively slowly compared to an IT signal.

The continuous digital time series is processed in the form of data frames of defined time duration, and additional series of data are derived. The additional series are formulated to highlight particular characteristics that then are used alone or in combination as characteristic feature sets. One of those feature sets is generally a quantity used as a detection statistic for a particular SOI. The calculated signal to noise ratio is an example of this where the expected noise, based on time averaged noise data, is used in the ratio denominator. Generally, the additional series are used to determine presence in the data of characteristics associated with classes to which Signals of Interest are associated.

The data frames may be sequential with no overlap of time signal data or they may be overlapping time frames. Frames comprising 4096 or 2048 signal values may, for example, be formed in sequential steps with an overlap of 1024 or 512 or 256 values. Thus the overlap may vary depending upon processing required to identify distinguishing source characteristics of a particular signal type in the given time series. Once a signal of potential interest is detected, the combined set of continuous raw and derived series data is discretized and consolidated into a detection object containing the characteristics of the signal which resulted in the detection. At this point the continuous data stream has been reduced to a set of information contained within the detection object. Single cycle detection objects may exist across adjacent frames of data. The process resulting in a formation of a single-cycle detection object is termed "single-cycle processing" and involves operating the detection algorithm on a continuous data stream, but the analysis may proceed in the time domain, the frequency domain, or other vector space projections of the raw time-series.

For example, it has been found that IT signals are best distinguished by applying detection algorithms in the time-domain. Time domain processing may be performed on data frames that do not-overlap in time at all, or on buffers that do overlap. In the context of classifying IT signals, the term "single-cycle processing" (corresponding to the afore described first assessment), refers to the action of a set of algorithms operating on an individual time domain data packet (e.g., one frame of data) processed by the system to generate several derived series. Single-cycle processing generates one or more single-cycle detection objects comprising a consolidated set of information which describes specific features of the current signal observed by the detection algorithms.

When applying the detection system 30 to classify an IT signal, time domain processing may include (i) use of a derived series to compare measured power of the signal with the time averaged power of ambient noise (where values of noise power are estimates based on earlier data sampling, (ii) determination of the dominant frequency band of the signal, or (iii) analysis of particular time-phase patterns of the signal. For example, if the estimated power of the signal is used as the detection statistic for a particular signal of interest (SOI), when that estimated power rises above a specified threshold, a detection object would be opened, and remain open until a criteria of detection quality, which may be the estimated power or a feature of a different derived series, drops below some critical value, or a duration time is exceeded, at which time the detection object becomes "closed."

In contrast to IT signals, FMCW signals are best distinguished by applying detection algorithms within the frequency domain. The detection system 30 applies frequency domain processing on overlapping data frames with a duration dictated by the required frequency resolution and an overlap dictated by the required time resolution. In the context of classifying FMCW signals, the term "single-cycle processing" refers to the action of a set of algorithms operating on an individual time domain data packet (e.g., one frame of data) which has been transformed into the frequency domain. In the frequency domain, additional information is derived which may include feature spaces that are normalized and reduced in dimensionality or additional transforms of the frequency domain data.

When applying the detection system 30 to classify FMCW signals, processing includes use of the derived series to compare the spectral power of the signal with the time averaged power of the ambient noise and determine the spectral content of the power structure which the signal exhibits. The result of applying "single-cycle processes" to an FMCW signal is a set of single cycle FMCW detection objects capturing narrow band phenomena as well as the consolidated set of information which describes the frequency content of the current time-series within the processed frame of data.

With regard to SOI's generally, the detection system 30 makes single cycle detection objects available to an array of information processing modules resident in the Data Processing Assembly 38 for classifying signals of potential interest. Those modules may include single-cycle classification algorithms operating on individual detection objects, multi-cycle processing algorithms operating on the extended set of single-cycle detection objects, and multi-cycle classification algorithms operating on the combined results derived from prior application of information processing algorithms.

The term "multi-cycle processing" refers to the operation of a set of algorithms on the set of single-cycle results. Multi-cycle processing creates one or more multi-cycle detection objects and additional derived information. Multi-cycle processing may include chaining or tracking algorithms, sequential analysis algorithms, expert logic, and source specific algorithms designed to derive additional multi-cycle features. The multi-cycle algorithms existing in the processing chain prior to the classification algorithms generally derive additional information from groups of single-cycle detection objects alone or in combination with other multi-cycle information.

For classifying IT signals, the detection system 30 creates multi-cycle detection objects by associating observed time domain impulses which are thought to have originated from the same signal source or those which are positioned adjacent one another in the time series. The likelihood of there being an association between a signal of potential interest derived from a single cycle process, and any particular multi-cycle detection object may be quantified using metrics based upon the similarity in power of the single cycle detection objects, the similarity in waveform of the single cycle detection objects, the time distance between single cycle detections, or the expected time position of single-cycle detections.

Monitoring the single cycle detections for association with a multi-cycle detection object may be a continuous process until the multi-cycle detection object is closed. The consistency of determinations that the initial hypothesis is true may be measured over the lifetime of the multi-cycle detection object and metrics defining the quality of the association may be derived. An association between a single cycle detection and a multi-cycle detection object is considered valid when this metric of quality exceeds some value and can be considered "closed" when a criterion of quality drops below some value or a duration time is exceeded. The time evolution of such a multi-cycle detection object may be estimated and predicted for following time segments using a state based approach, such as a Kalman filter, in which case the multi-cycle detection object may form a chain or a cluster.

The association of a signal of potential interest derived from a single cycle process with a multi-cycle detection object renders IT classification a fundamentally event-driven process. When a detection object is adjacent the boundary of a data frame, that object is maintained in an "open" state, and may continue to assimilate information present in the next data frame if the potential signal of interest crosses the frame boundary into the next time-adjacent frame. Another perspective of IT processing is that the multi-cycle chain or cluster is fundamentally an event-driven process. However, the desire for computational and data-handling efficiency dictates that a cyclic processing be superimposed over any fundamental event-driven nature.

For the FMCW system, multi-cycle detection objects may be created through the association of frequency domain detections from single time frames (single-cycle FMCW detection objects) which are thought to have originated from a single source. The hypothesis of joint-time-frequency domain association may be based on a similarity in power of the frequency domain detection, expected frequency value, continuation of phase value, or similar frequency domain based features. For FMCW joint time-frequency association, it is assumed that a given source producing a frequency domain signature will have a frequency domain feature set that may modulate slowly with respect to the buffer rate. The time evolution of such a multi-cycle detection object may be estimated and predicted for the following time segment using a state based approach, such as a Kalman filter, in which case the multi-cycle detection object forms a joint-time-frequency (JTF) domain track.

The association between single-cycle FMCW detection objects and multi-cycle FMCW detection objects may be monitored over the lifetime of the JTF domain track. The consistency with which the initial hypothesis is found to be true (smooth frequency transition and smooth power transition) may be used as a quality metric. The track is considered valid when this metric exceeds some value and can be considered "closed" when the quality drops below some value.

The purpose of the classification algorithms is to generate a statistically robust decision as to the type of source generating the SOI. The classifier may generate an instantaneous Determination 20 based on whatever information is available at a point in time (single cycle-classification), or it may generate a decision based on current signal information in combination with information derived from multiple prior time cycles. Initially the detection system 30 issues single-cycle-classification decisions as "Warning" determinations, reserving the final "Alert" determinations for decisions based on processing with multi-cycle classification algorithms. Using this paradigm, multiple types of sources may coexist in the data stream and be successfully separated and classified so long as the single cycle and multiple cycle feature sets derived therein are separable. Multi-cycle classification includes the analysis of the chain or cluster (IT processing), or track (FMCW processing) using statistical algorithms that may include linear discrimination analysis (LDA), quadratic discrimination analysis (QDA), logistic regression classification (LRC), and classification and regression trees (CART) among others. The multi-cycle classification algorithms culminate in a classification decision based on the consolidated multi-cycle feature set.

One application of the detection system 30 is provision of a single sensor device that operates with the afore-described analysis and reporting capabilities to communicate a variety of information to a remote receiver 42. In other applications, a group of independent sensors may form a network wherein each reports to a common monitoring station, which may be a portable display device, such as a laptop computer, personal digital assistant, or a palmtop-sized personal computing device. The individual sensor systems may operate independently of one another and are typically portable, though they may be permanently installed. Both the architecture and function of the individual systems may be modified to suit specific applications. For example, the electronics need not be integrated with the sensor device, the electronics may provide different functions and the data sent through the communications module 40 may be varied. The system may be deployed to monitor a perimeter or length associated with valued assets, such as a war fighter forward operating base or equipment storage area, or a critical infrastructure site, or valued assets of a personal, industrial or commercial utility operation, or a geopolitical border, and provide surveillance, such as monitoring for activities of interest along a line or in a area local to the individual sensors or network of sensors.

Figure 12:
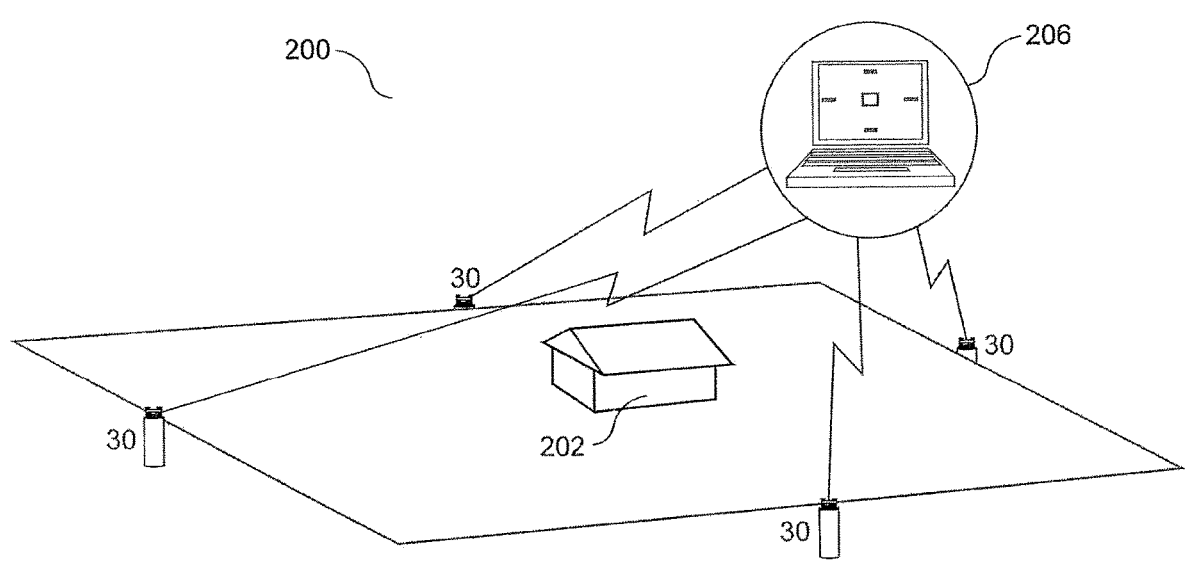
FIG. 12 illustrates a system for monitoring an area according to the invention.

FIG. 12 illustrates such a system 200 comprising multiple detection systems 30 deployed around a valued asset 202. Each sensor is deployed in the same manner as a single detection system 30, working independently of the others, communicating to a monitoring station 206 reports, Warnings and Alerts. Communication between each detection system 30 and the monitoring station 206 may be direct, with or without an intervening transceiver, such as a repeater. However, communications may be through formation of an ad-hoc network where the sensors themselves act as intermediaries forwarding communication packets to the common monitoring station 206. The ad-hoc network, referred to as a mesh network, is a self-configuring network of communications nodes. That is, each detection system 30 may be configured as a communications node within the network, forwarding messages from other sensors, while also acting as a sensor element and generating messages on its own.

In the system 200, information sent from each detection system 30 is coded to identify the sending system 30. The common monitoring station 206, not necessarily located in a central part of the network, contains software that enables the decoding, attribution, and organization of the communicated messages. The common monitoring station 206 may also include a graphical interface or display, such that the information can be referenced to the sensor identity or displayed using a geographic information system layout, showing the position of the sending sensor on a map. The available source signatures for monitoring in the multiple sensor embodiment are the same as for a single sensor, and include the entire variety of aforementioned signature classes. In addition, reports of persistent activity over time are available, as are state-of-health messages, the assessment being made on the monitoring station using pertinent information analysis algorithms.

For the embodiment of FIG. 12, such multisensor systems 200 are typically provided in "kits", containing the individual detection systems 30, batteries, embedded communications systems to link each sensor with the monitoring station, and the monitoring station 206. When deploying the sensors, a maximum area can be monitored by spacing the sensors at the limits of their sensitivity ranges for the source signatures of interest. To increase confidence in reported Alerts, the sensors can be placed closer together, overlapping their sensitivity ranges and providing multiple alerts for a given signature source. Raw measurement data are processed first by a multi-stage signal processor subsystem built directly inside the individual sensor systems. Further processing may be performed by the monitoring station to draw inferences regarding SOI's.

Using multiple sensor devices 32 or multiple detection systems 30 in a monitoring system adds the advantages of larger area coverage and, optionally, higher confidence in alert accuracy relative to the performance of single sensor systems. Additional advantages are gained by forming a multiple sensor system as a coordinated array of sensors devices and using coordinated array data processing methodologies. In such embodiments, some of the data processing electronic elements may be physically removed from each detection system 30 and be contained in a "smart node" processing system. The individual sensor systems may be coupled to the Smart Node by cable having internal conductors that carry continuously digitized or analog seismic data from each sensor to the Smart Node. The sensor systems may also transmit data to the Smart Node using a wireless communications link.

Figure 13:
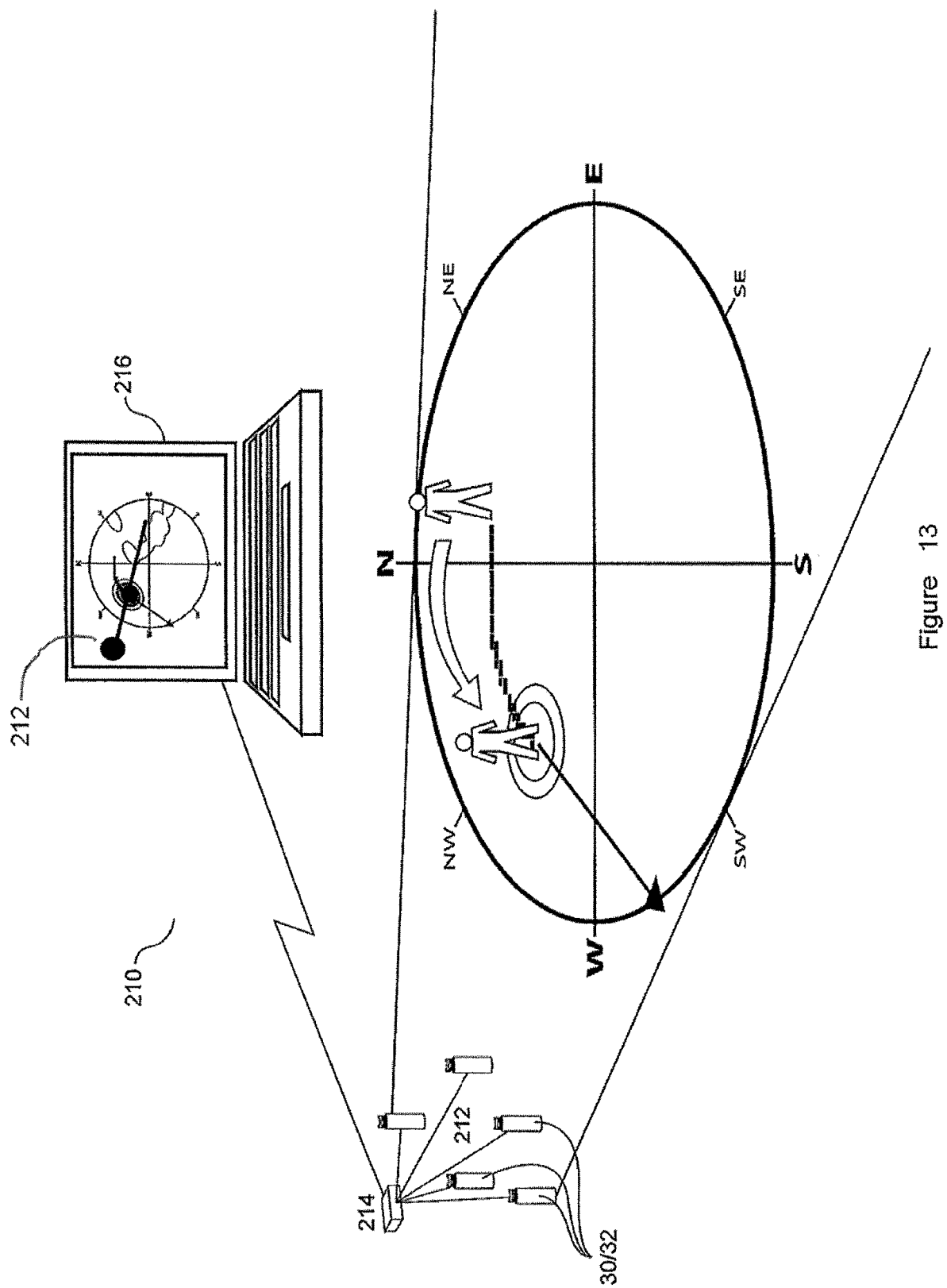
FIG. 13 illustrates a smart node processing system incorporating a sensor device and array processing according to the invention.

A functional illustration of such a smart node processing system 210, utilizing array processing, is shown in FIG. 13. Multiple sensor devices 32, or sensor systems having processing capability of the nature described for the detection system 30, are deployed as an array 212. The sensors continually acquire seismic acoustic data and transmit the data to a smart node processing unit 214. In addition to receiving, organizing, and storing digital seismic data, supplying power and a master clock signal to the individual sensor systems (for a wired array arrangement), and monitoring the state of health of the individual sensors, the processing unit 214 combines and processes the entirety or subsets of the data received from the sensors populating the array 212 in order to extract actionable information.

The processing unit transmits the information developed through processing the combined data either by wire or wirelessly to a typically remote monitoring station 216, which can be any computer-based system containing a transceiver and monitor/display capability. The remote monitoring station 216 contains all of the functionality of the multiple sensor network common monitoring station 206, and may contain additional functionality such as a visual representation of the site's response to its environment, a near real time visual display of the processed array information, a visual display of historical information from the array, and near real time and historical information from other independent sensors not within the array and other independent arrays.

Such geographical information displays appear similar to weather radar, where activity detection probabilities appear as color coded or color contoured regions superimposed over the geographical map of the monitored area. Such outputs from the combined information set may be fused with additional visual or other systems such as pan/tilt zoom cameras and closed circuit television for security personnel assessment. This approach provides extreme scalability from a single site to a large geographical area that may consist of multiple sites. The visual geographical fused information display can easily zoom in from large area coverage to specific sites of activity while providing complete situational awareness of the larger contextual monitored area.

The smart node processing system 210 performs complex and computationally intensive operations such as combined coherent processing of the array data. Coherent array processing provides advantages by performing signal processing in both time and space. This requires seismic-acoustic sensors that are synchronized to a common time base and deployed as arrays, with multiple arrays potentially surrounding an area of interest. The key enabling technologies for this capability are (1) high sensitivity, highly coherent seismic-acoustic sensors, and (2) Frequency-Wave Number (FK) beam forming. Three coherence factors must come together to make seismic-acoustic array processing possible: (1) coherence in time, (2) coherence in space, and (3) measurement coherence. Temporal and spatial coherence are achieved through Global Positioning System (GPS) technology and by laying out sensors in arrays with appropriate spacing.

"Measurement coherence" means that the sensors must respond identically to seismic energy, in both amplitude and phase. Most seismic sensors use systems of springs and masses in conjunction with damping elements to convert seismic energy to electrical voltage signals, and as such these sensors are difficult and expensive to manufacture with sufficient coherency for array processing, especially over a broad frequency band that includes frequencies in the audible range producing acoustic energy. The disclosed sensor, due to its design and sensing material properties, provides extreme coherence from sensor to sensor.

The unusually uniform phase and frequency response between sensors generates an unusually high array gain compared to typical seismic sensors when coherent processing methods are employed. Coherent processing, often called beam forming but not limited to creating beamed data, is commonly used with active and passive RADAR and SONAR systems in order to "spotlight" particular geographic sectors through the amplification of coherent signals and attenuation of incoherent noise. Seismic array processing uses the same well-established principles to enhance detection in a specific geographic area by defining a beam using the appropriate frequency and wave number parameters.

In geophysical investigations coherent processing methods are formulated into wave number manipulations within the frequency domain to form beamed data (FK beams, after the generally accepted mathematical symbols for frequency and wavenumber). The general FK algorithm searches for global maxima of combined array power as a function of both frequency and the wave number vector, where frequency describes periodicities in time (cycles per second) and wave number describes periodicities in space (cycles per meter), determined for overlapping time frames. The result is a beam that pinpoints the direction to the source of seismic energy even when the energy propagation is not simple. Coherent processing is performed by the Smart Node software, either in embedded or host-based electronics platforms depending upon the requirements of the application.

Extending the FK beam-forming methodology, energy maxima exceeding a preset threshold, registered as single-cycle detection objects, may be automatically tracked using a Kalman filter or similar tracking algorithm operating in the FK slowness space. For persistent FK domain tracks surpassing a time-cycle length threshold, a beam recipe may be formulated, consisting of a set of delays and weights, one for each sensor element in the array, allowing either a traditional delay—and—sum fixed beam to be formed on the target, or allowing for a continually steered beam to be formed as the track is updated, and existing as long as the FK track persists. As the FK track is updated, the Kalman algorithm predicts the next location of the source, a new beam recipe is formed, and the steered beam adjusted and computed.

The resulting time series waveform becomes a "dynamic seismogram" that follows the source of energy wherever it moves. If the energy is stationary, the steered beam remains fixed, but ready to move if the source moves. Steered beams appear when a source of energy appears, move to follow the source as the source moves and disappear when the source of energy disappears. The time series waveforms generated from the fixed or steered beam may then be forwarded to the existing suite of signal and information processing algorithms for further processing and alert generation.

Although example embodiments according to the invention have been described, numerous other devices, systems and methods will be apparent, and it will be understood by those skilled in the art that various changes may be made and equivalents may be substituted for elements thereof without departing from the scope of the invention. The following summarizes numerous aspects of the invention.

A sensing system has been described which is responsive to acoustic or seismic signals. In the system a foil layer has first and second opposing surfaces and piezoelectric properties. The layer is configured as a sheet having a border divisible into a continuous series of segments, each adjoining another segment. The border extends completely around an edge of the sheet such that the entirety of the layer is bounded by the border. The layer has a fixed shape whereby none of either the first surface or the second surface overlaps any portion of the first surface or the second surface. In one series of embodiments no border segment contacts another border segment other than an adjoining segment. Accordingly, for certain embodiments the foil is not formed in the shape of a closed cylinder, as could occur when opposing edges abut or overlap one another. Rather, a gap may exist between opposing edges wrapped about the mandrel. The system includes a frame, also referred to as a substrate, having a frame surface along or about which the foil layer is positioned in a manner which provides the foil layer a stable shape while permitting the sheet to be responsive to a wavefield of seismic or acoustic energy. Coupling between the sheet and the frame or substrate may be so limited as to render direct coupling of the sheet with the wavefield the predominant means for stimulating the sensor element with seismic energy.

The frame surface may be in the form of an open or closed loop. As a closed loop the frame is similar in form to a picture frame without a backing, having the border of the foil layer attached to the frame, e.g., with the frame extending completely around the foil layer. In other embodiments, the frame may have a surface of tubular shape (e.g., like a cylinder or any other solid such as a sphere or a spiral or an ellipsoid), along or about which the foil layer is positioned in a manner which provides the foil layer a stable shape while permitting the sheet to be responsive to a wavefield of seismic or acoustic energy. Coupling between the sheet and the substrate may be so limited as to render direct coupling of the sheet with the wavefield the predominant means for stimulating the sensor element with seismic energy.

A sensing system is provided which is responsive to acoustic or seismic signals. The system includes a frame having a tubular shaped surface and a sheet of piezo-electric foil, responsive to a wavefield of seismic or acoustic energy. The sheet comprising a polymer layer having piezoelectric properties, the polymer layer having first and second major surfaces. A first layer of conductor is formed on the first major surface and a second layer of conductor is formed on the second major surface. An insulating layer of material is formed on a side of the second layer of conductor facing away from the polymer layer. A third layer of conductor is formed on a side of the insulating layer facing away from the polymer layer. The sheet extends about the tubular shaped surface frame, and coupling between the sheet and the frame is so limited as to render direct coupling of the sensor element with the wavefield the predominant means for stimulating the sensor element with seismic energy in the $d_{33}$ mode.

According to another embodiment, a sensing system, responsive to acoustic or seismic signals, comprises a frame and a foil. The foil, responsive to a wavefield of seismic or acoustic energy, extends about the frame. Coupling between the cable element and the frame is so limited as to render direct coupling of the sensor element with the wavefield the predominant means for stimulating the sensor element with acoustic or seismic energy.

The invention claimed is:

1. A sensing system responsive to energy of a signal in a seismic wavefield while the wavefield is propagating within an earthen medium, the system comprising:
   a foil layer in the form of a sheet having piezoelectric properties configured to respond to the signal in the seismic wavefield;
   a frame having a surface along which the foil layer is positioned in a spaced-apart relation to the frame, this providing a limited connection between the surface of the frame and the foil layer which stabilizes the foil layer and, when the foil layer and frame are positioned within the earthen medium, renders the foil layer responsive primarily in the $d_{3h}$ mode to the signal received by the foil layer within the earthen medium by direct coupling of the foil layer with a portion of the wavefield signal.

2. The system of claim 1 where, when the system is positioned within the earthen medium, a path along which the foil layer receives the most seismic energy predominantly includes wavefield energy via said direct coupling of the foil layer with the portion of the wavefield signal while the wavefield signal is propagating within the earthen medium.

3. The system of claim 2 where the spaced-apart relation between the frame and the foil layer renders the foil layer more responsive to energy received via said direct coupling of the foil layer with energy propagating within the earthen medium than to energy transferred between the foil layer and the frame.

4. The system of claim 3 further including an intermediate layer positioned along the spaced-apart connection with the combination of the intermediate layer and the spaced-apart connection sufficiently reducing mechanical coupling of seismic energy between the foil layer and the frame to render said direct coupling of the foil layer with seismic energy propagating within the earthen medium the predominant path for stimulating the foil layer with seismic energy.

5. The sensing system of claim 4 where, with the foil layer positioned about the intermediate layer, post manufacture tensioning of the foil layer about the intermediate layer increases sensitivity of response of the foil layer to a signal in the wavefield while the combination of the spaced-apart relation of the foil layer to the frame and the intermediate layer so limit mechanical coupling between the foil layer and the frame as to render said direct coupling of the foil layer with the seismic energy propagating within an earthen medium the predominant means for stimulating the foil layer with seismic energy.

6. The sensing system of claim 4 where the intermediate layer is characterized by a lower Young's modulus than that of the frame or comprises a closed-cell foam material.

7. The sensing system of claim 1 further including an intermediate layer positioned along the spaced-apart connection and which combination of the spaced-apart connection and the intermediate layer sufficiently reduces mechanical coupling between the foil layer and the frame so that the predominant path for stimulating the foil layer with seismic energy is by direct coupling of the foil layer with seismic energy within the earthen medium and thereby renders the sensor more responsive to seismic energy received via said direct coupling of the foil layer with the wavefield than to energy transferred between the frame and the foil layer through the intermediate layer.

8. The system of claim 1 where the foil layer functions as a point receiver in a frequency range up to at least 1,000 Hz and exhibits a substantially omni-directional sensitivity pattern.

9. The system of claim 8 where the frame is cylindrically shaped and the system provides a SNR of no less than 23 dB at a frequency of 125 Hz.

10. The system of claim 1 where the foil layer is entirely spaced away from the frame.

11. A method of forming a sensing system responsive to energy of a signal in a seismic wavefield while the wavefield is propagating within an earthen medium, the method comprising:
providing a foil layer in the form of a sheet having piezoelectric properties configured to respond to a seismic wavefield;
providing a frame;
positioning the foil layer along a surface of the frame in a spaced-apart relation to the frame; and
positioning an intermediate layer between the foil layer and the frame, this providing a spaced-apart connection between the surface of the frame and the foil layer which stabilizes the shape of the foil layer and which, when the foil layer and frame are positioned within an earthen medium, renders the foil layer responsive primarily in the $d_{3h}$ mode to the signal in the wavefield received by the foil layer within the earthen medium by direct coupling between the foil layer and the signal while the signal is propagating within the earthen medium.

12. The method of claim 11 including forming the frame surface with a tubular shape.

13. The method of claim 11 further including positioning an intermediate layer between the frame surface and the foil layer to so limit mechanical coupling between the foil layer and the frame as to render the direct coupling of the foil layer with the wavefield the predominant means for stimulating the point sensor with seismic energy.

14. The method of claim 13 where the intermediate layer is selected to have a lower Young's modulus than that of the frame.

15. The method of claim 13 where the step of positioning the foil layer includes tensioning of the foil layer about the intermediate layer to further increase sensitivity of response of the foil layer to a signal in the wavefield while the intermediate layer so limits mechanical coupling between the foil layer and the frame as to render the direct coupling of the sheet with the wavefield the predominant means for stimulating the point sensor with seismic energy.

16. The method of claim 11 where effecting the spaced-apart connection with the intermediate layer sufficiently reduces mechanical coupling for transmission of energy between the foil layer and the frame, as well as between the foil layer and other structure existing between the foil layer and the frame, this rendering the sensor more responsive to energy received via the direct coupling of the foil layer with the wavefield than to energy transferred between the frame and the foil layer.

17. The method of claim 11 where the spaced-apart connection is formed with a continuous intermediate layer between the foil layer and the frame without forming a bond between the continuous intermediate layer and the foil layer, the continuous intermediate layer reducing the mechanical coupling between the foil layer and the frame and thereby limiting transfer of energy between the foil layer and other structure positioned between the foil layer and the frame.

18. The method of claim 11 where the reducing of mechanical coupling of energy between the foil layer and the frame effected by the intermediate layer limits external damping of the response of the foil layer compared to when the foil layer is coupled to the frame or other structure.

19. The method of claim 11 where, with reduced mechanical coupling of energy between the foil layer and the frame, the foil layer is responsive to wavefield energy primarily in the $d_{3h}$ mode.

20. The method of claim 11 including interfacing circuitry to the foil layer to transform separations of charge, occurring when material of the foil layer undergoes strain, into voltages and to convert the voltages into digital data in response to signals in the wavefield sensed by the foil layer.

21. The method of claim 11 where the combination of the spaced-apart connection and the intermediate layer sufficiently reduces mechanical coupling between the foil layer and the frame such that the predominant path for stimulating the foil layer with energy of the signal in the seismic wavefield includes direct coupling of the foil layer with the wavefield.

22. The method of claim 21 where combination of the spaced-apart connection and the intermediate layer renders the sensor more responsive to energy received via the direct coupling of the foil layer with the wavefield than to energy transferred between the frame and the foil layer.

23. The method of claim 22 where the intermediate layer is positioned between the foil layer and the frame without forming a bond between the intermediate layer and the foil layer and with the foil layer positioned in an entirely spaced-apart relation to the frame to render the sensor more responsive to energy received via the direct coupling of the foil layer with the wavefield than to energy transferred between the frame and the foil layer.

24. A sensing system responsive to energy of a signal in a seismic wavefield while the wavefield is propagating within an earthen medium, the system comprising:
   a foil layer in the form of a sheet having piezoelectric properties configured to respond to a seismic wavefield;
   a frame having a surface along which the foil layer is positioned in a spaced-apart relation to the frame, this providing a limited connection between the surface of the frame and the foil layer which stabilizes the foil layer and, when the foil layer and frame are positioned within the earthen medium, renders the foil layer responsive to the signal in the wavefield received by the foil layer within the earthen medium by direct coupling of the foil layer with a portion of the wavefield signal, the system further including:
   an intermediate layer, positioned between the foil layer and the frame, positioned under tension without a bond formed between the intermediate layer and the foil layer, wherein:
   (i) the spaced-apart connection is effected with the intermediate layer to sufficiently reduce mechanical coupling between the foil layer and the frame to render the foil layer more responsive to energy received via direct coupling such that the predominant path for stimulating the foil layer with seismic energy includes direct coupling of the foil layer with the wavefield, and
   (ii) the connection thereby renders the sensor more responsive to energy received via the direct coupling of the foil layer with the seismic wavefield than to energy transferred between the frame and the foil layer.

25. A sensing system responsive to a signal in a wavefield of seismic energy, comprising:
   a sensor responsive to strains in the wavefield of seismic energy, the sensor including a foil layer in the form of a sheet having piezoelectric properties and configured to respond to the signal in the seismic wavefield;
   a frame having a surface along or about which the foil layer is positioned;
   an intermediate layer positioned between the foil layer and the frame with the foil layer positioned about the frame in a spaced-apart relation to the frame, this providing a spaced-apart connection between a surface of the frame and the foil layer with the shape of the foil layer stabilized, wherein:
   (i) the spaced-apart connection is effected with the intermediate layer to sufficiently reduce mechanical coupling between the foil layer and the frame as to render the predominant path for stimulating the foil layer with seismic energy in the wavefield includes direct coupling of the foil layer with seismic wavefield energy, and
   (ii) the connection thereby renders the sensor more responsive to energy received via the direct coupling of the foil layer with the wavefield than to energy transferred between the frame and the foil layer.

26. The system of claim 25 where the intermediate layer is positioned under tension without a bond formed between the intermediate layer and the foil layer and the foil layer is positioned in an entirely spaced-apart relation to the frame.

27. A sensing system responsive to a wavefield comprising seismic energy while the wavefield is propagating within an earthen medium, the system comprising:
   a point sensor which exhibits an omni-directional sensitivity pattern to seismic wavefield energy at least within a frequency range extending between 2 Hz and 1000 Hz, the point sensor comprising a continuous foil layer in the form of a sheet having piezoelectric properties and responsive in the $d_{3h}$ mode (i) to detect seismic waves and (ii) to measure strain caused by the seismic waves with omnidirectional sensitivity while the waves are traveling through the earthen medium from a source; and
   a frame having a surface along which the sheet is positioned in a spaced-apart relation to the frame, this providing a connection between the surface of the frame and the sheet wherein, when the sheet and frame are positioned within the earthen medium, the foil layer is responsive to both compressive strains and shear strains received by the sheet within the earthen medium by direct coupling of the sheet with seismic energy propagating within the earthen medium.

28. The system of claim 27 wherein, with the system responding as a point sensor, cancellation effects are reduced among components of a signal acquired over the effective area of the foil layer relative to cancellation effects for a sensor not operating as a point receiver.

29. The system of claim 27 where, with the sheet positioned in the spaced-apart relation to the frame, mechanical coupling between the sheet and the frame is sufficiently reduced such that
   (i) the predominant path for stimulating the foil layer with seismic energy is by direct coupling of the sheet with the wavefield, and
   (ii) the spaced-apart connection thereby renders the sensor more responsive to energy received via the direct coupling of the sheet with the seismic wavefield than to energy transferred between the frame and the sheet.

* * * * *